United States Patent
Katoh et al.

(10) Patent No.: US 9,412,093 B2
(45) Date of Patent: *Aug. 9, 2016

(54) COMPUTER-READABLE RECORDING MEDIUM, EXTRACTION DEVICE, AND EXTRACTION METHOD

(71) Applicant: FUJITSU LIMITED, Kawasaki-shi, Kanagawa (JP)

(72) Inventors: Takashi Katoh, Yokohama (JP); Shinichiro Tago, Shinagawa (JP); Tatsuya Asai, Kawasaki (JP); Hiroaki Morikawa, Kawasaki (JP); Hiroya Inakoshi, Tama (JP); Nobuhiro Yugami, Minato (JP)

(73) Assignee: FUJITSU LIMITED, Kawasaki (JP)

( * ) Notice: Subject to any disclaimer, the term of this patent is extended or adjusted under 35 U.S.C. 154(b) by 423 days.

This patent is subject to a terminal disclaimer.

(21) Appl. No.: 14/037,514

(22) Filed: Sep. 26, 2013

(65) Prior Publication Data

US 2014/0136149 A1    May 15, 2014

(30) Foreign Application Priority Data

Nov. 15, 2012  (JP) .................................. 2012-251668

(51) Int. Cl.
G06Q 10/10        (2012.01)
(52) U.S. Cl.
CPC ..................................... *G06Q 10/10* (2013.01)
(58) Field of Classification Search
CPC .................................................. G06Q 10/10
USPC ........................................................ 702/189
See application file for complete search history.

(56) References Cited

U.S. PATENT DOCUMENTS 8,041,721 B2   10/2011   Tago
8,122,025 B2   2/2012    Ando et al.
(Continued)

FOREIGN PATENT DOCUMENTS

JP        04-125734      4/1992
JP        8-6957 A       1/1996
(Continued)

OTHER PUBLICATIONS

Ordonez, C. et al., "Horizontal Aggregations in SQL to Prepare Data Sets for Data Mining Analysis", IEEE Transactions on Knowledge and Data Engineering, vol. 24, No. 4. pp. 678-691, Apr. 2012, IEEE Computer Society.

(Continued)

*Primary Examiner* — Bryan Bui
(74) *Attorney, Agent, or Firm* — Fujitsu Patent Center

(57) ABSTRACT

When a second pattern is to be generated by adding an event to a first pattern including events, an extraction program causes a computer to execute the following process based on combinations of events. That is, the extraction program causes the computer to generate the second pattern when the number of occurrence, in the second pattern, of each of the events included in the combinations is not more than a threshold. The extraction program causes the computer to calculate, based on data including a plurality of events, a frequency at which one or more of the generated second patterns occur in the data. The extraction program causes the computer to extract the second pattern having the frequency satisfying a predetermined condition. The extraction program causes the computer to add a new event to the extracted second pattern.

12 Claims, 18 Drawing Sheets

(56) References Cited

U.S. PATENT DOCUMENTS

| | | |
|---|---|---|
| 8,176,050 B2 | 5/2012 | Inakoshi et al. |
| 8,190,632 B2 | 5/2012 | Tago et al. |
| 8,655,921 B2 | 2/2014 | Tago et al. |
| 8,732,117 B2 | 5/2014 | Maruhashi et al. |
| 2005/0257006 A1 | 11/2005 | Yoshida et al. |
| 2008/0033895 A1 | 2/2008 | Sakurai |
| 2009/0009807 A1 | 1/2009 | Sugi |
| 2009/0150391 A1* | 6/2009 | Maeda ............... G06Q 30/02 |
| 2009/0216751 A1 | 8/2009 | Tago |
| 2011/0182479 A1 | 7/2011 | Sese et al. |
| 2013/0066827 A1 | 3/2013 | Maruhashi et al. |
| 2013/0325761 A1 | 12/2013 | Morikawa et al. |
| 2014/0114900 A1 | 4/2014 | Katoh et al. |
| 2014/0136149 A1 | 5/2014 | Katoh et al. |
| 2014/0156692 A1 | 6/2014 | Katoh et al. |

FOREIGN PATENT DOCUMENTS

| | | | |
|---|---|---|---|
| JP | 2001522095 | A | 11/2001 |
| JP | 200840553 | A | 2/2008 |
| JP | 2009-17340 | | 1/2009 |
| JP | 2009-199446 | A | 9/2009 |
| JP | 2010113551 | A | 5/2010 |
| WO | 9923577 | A1 | 5/1999 |
| WO | 2004010232 | A1 | 1/2004 |
| WO | 2010041678 | A1 | 4/2010 |

OTHER PUBLICATIONS

Weng, N. et al., "Scalable Parallel Join for Huge Tables", Big Data (BigData Congress), 2013 IEEE International Congress on Big Data, pp. 157-164, IEEE Computer Society.

Zhu, H. et al., "Efficient Star Join for Column-oriented Data Store in the MapReduce Environment", 2011 Eight Web Information Systems and Applications Conference (WISA), pp. 13-18, IEEE Computer Society.

Su, W. et al., "Combining Tag and Value Similarity for Data Extraction and Alignment", IEEE Transactions on Knowledge and Data Engineering, Jul. 2012, vol. 24, No. 7, pp. 1186-1200, IEEE Computer Society.

US Notice of Allowance issued on Sep. 25, 2015 in co-pending U.S. Appl. No. 14/032,381, 19 pages.

US Non-Final Office Action mailed Sep. 17, 2015 for co-pending U.S. Appl. No. 14/037,446, 21 pages.

US Office Action dated Jul. 13, 2015 for U.S. Appl. No. 14/037,446, 23 pages.

Japanese Office Action mailed Apr. 19, 2016 for corresponding Japanese Patent Application No. 2012-232295, with Partial English Translation, 4 pages.

Japanese Office Action mailed May 31, 2016 for corresponding Japanese Patent Application No. 2012-251668, with Partial English Translation, 6 pages.

Sakurai, Shigeaki et al., "Decrease Method of Candidate Sequential Patterns in Sequential Pattern Discovery," Proceedings of Symposium on Database and Web Information Systems, Japan, Information Processing Society of Japan, Nov. 30, 2006, vol. 2006, No. 16, pp. 353-360. (see JPOA filed herewith, and English Abstract.)

* cited by examiner

COMPUTER-READABLE RECORDING MEDIUM, EXTRACTION DEVICE, AND EXTRACTION METHOD

CROSS-REFERENCE TO RELATED APPLICATION

This application is based upon and claims the benefit of priority of the prior Japanese Patent Application No. 2012-251668, filed on Nov. 15, 2012, the entire contents of which are incorporated herein by reference.

FIELD

The embodiments discussed herein are related to a computer-readable recording medium, an extraction device, and an extraction method.

BACKGROUND

There is an extraction device that extracts patterns included in patterns of events represented by event data that have actually occurred. As an example of the event data, there is exemplified event data that represents patterns of events indicating information and answers of a respondent who has replied to one questionnaire. A description will now be made of a case in which the event data includes an event A that "the respondent to the questionnaire is male", an event B that "the respondent to the questionnaire is aged in the thirties", and an event C that "the answer to Question 1 of the questionnaire is 'A1'". In this case, the extraction device extracts the following patterns. The extraction device extracts, for example, a pattern of the event A, a pattern of the events A and B, a pattern of the events A, B, and C, a pattern of the event B, a pattern of the events B and C, and a pattern of the event C. Extracting these patterns with the extraction device allows a user of the extraction device to understand that the respondent who is male and aged in his thirties has given the reply "A1" to Question 1.

The following extraction device is an example of the extraction device described above. For example, an extraction device generates a child from a parent in an enumeration tree and determines whether the generated child occurs in patterns of events represented by event data that have actually occurred, and thus extracts a pattern included in the patterns of events represented by the event data that have actually occurred. Such an extraction device generates a child pattern by adding events to a parent pattern. The extraction device then uses the newly generated child pattern as a parent pattern to generate again a child pattern. In this manner, the extraction device repeats generation of a child pattern until a predetermined condition is satisfied. Conventional examples are described in Japanese Laid-open Patent Publication No. 04-125734 and Japanese Laid-open Patent Publication No. 2009-17340.

However, the above-described extraction device has a problem in that it fails to extract patterns efficiently. Specifically, such an extraction device generates a pattern that does not exist as an extracted pattern. A description will be made of a case in which, for example, the following event is added to the parent pattern in addition to the above-described events A, B, and C. Specifically, a description will be made of a case in which there are an event D that "the respondent to the questionnaire is female", an event E that "the respondent to the questionnaire is aged in the twenties", and an event F that "the answer to Question 1 of the questionnaire is 'A2'". In this case, the events A and D do not occur together in a pattern of events represented by the event data that represents the pattern of events indicating information and answers of a respondent who has replied to one questionnaire. That is because the sex of the respondent is either male or female. In addition, the events B and E do not occur together in such a pattern of events. That is because it is impossible to belong to both generations of the twenties and the thirties. Moreover, when Question 1 of the questionnaire is to be replied in the form of giving one answer, the events C and F do not occur together in such a pattern of events.

However, when a parent pattern includes the event A, the above-described extraction device generates a child pattern including the events A and D by adding the event D to the parent pattern. In the same way, when a parent pattern includes the event B, the above-described extraction device generates a child pattern including the events B and E by adding the event E to the parent pattern. When a parent pattern includes the event C, the above-described extraction device generates a child pattern including the events C and F by adding the event F to the parent pattern. In other words, the above-described extraction device generates patterns that include combinations of events that do not occur in events represented by event data, that is, mutually exclusive events. Although the patterns include the combinations of events that do not occur in the events represented by the event data, the above-described extraction device performs unnecessary processing of determining whether such patterns occur in the patterns of the events represented by the event data. This poses a problem in that the above-described extraction device fails to extract patterns efficiently.

SUMMARY

According to an aspect of an embodiment, a non-transitory computer-readable recording medium stores therein an extraction program that causes a computer to execute a process. The process includes, when a second pattern is to be generated by adding an event to a first pattern including events, generating the second pattern when, based on combinations of events stored in a storage unit, number of occurrence, in the second pattern, of each of the events included in the combinations is not more than a threshold; based on data including a plurality of events stored in the storage unit, calculating a frequency at which the second pattern occurs in the data; extracting the second pattern having the frequency satisfying a predetermined condition; and adding an event to the extracted second pattern.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings.

It is to be noted that the embodiments do not limit the technique disclosed herein.

[a] First Embodiment

Configuration of Extraction Device

Figure 1:
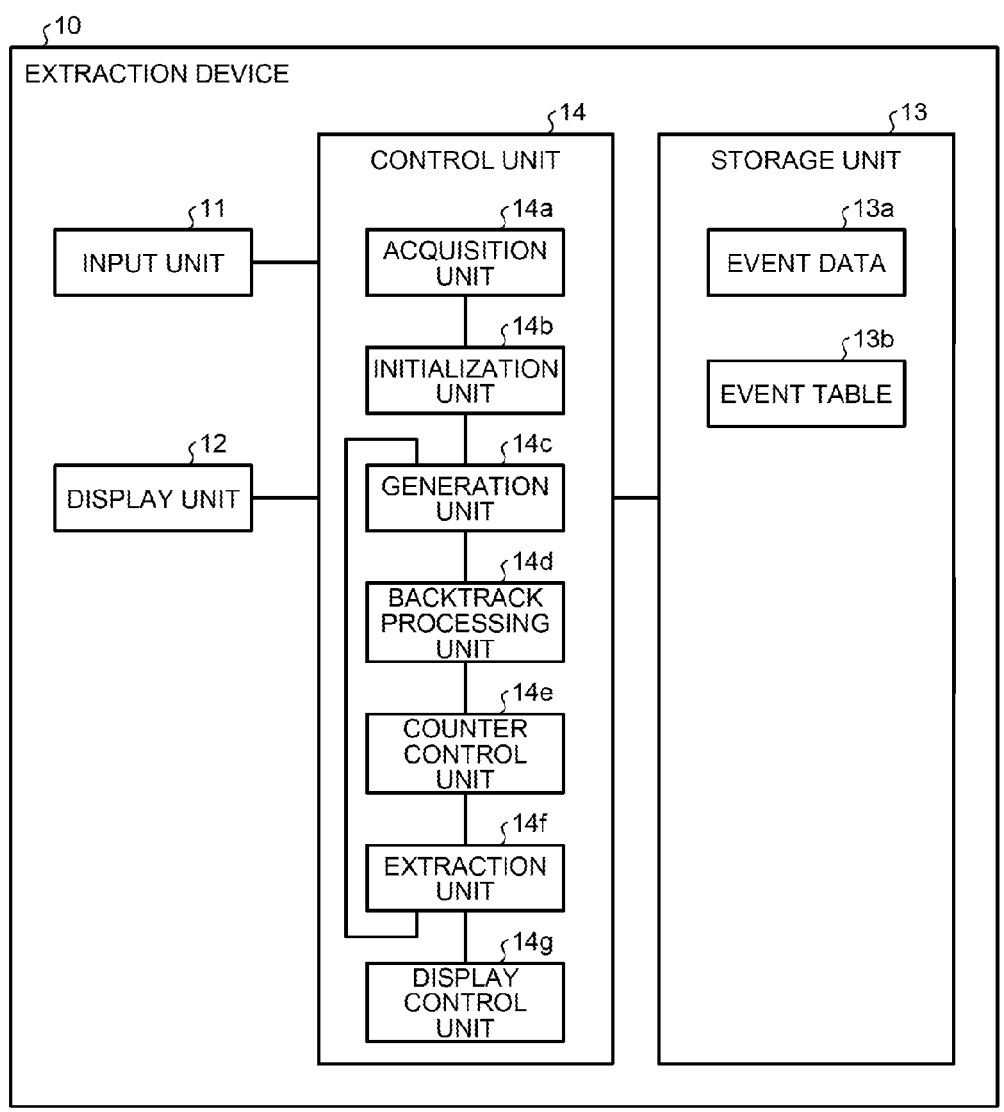
FIG. 1 is a diagram illustrating an example of a functional configuration of an extraction device according to a first embodiment of the present invention.

A description will be made of an extraction device according to a first embodiment of the present invention. FIG. 1 is a diagram illustrating an example of a functional configuration of the extraction device according to the first embodiment. As illustrated in FIG. 1, this extraction device 10 includes an input unit 11, a display unit 12, a storage unit 13, and a control unit 14.

The input unit 11 enters information into the control unit 14. For example, the input unit 11 accepts an instruction from a user, and enters, into the control unit 14, an instruction to execute an extraction process to be described later. The input unit 11 also accepts an instruction from the user, and enters, into the control unit 14, an instruction to acquire event data 13a to be described later from a predetermined server. The input unit 11 accepts an operation from the user, and supplies an event table 13b to be described later into the control unit 14. A keyboard and a mouse are examples of devices of the input unit 11.

The display unit 12 displays thereon various types of information. For example, the display unit 12 displays thereon a pattern extracted by an extraction unit 14f to be described later under the control of a display control unit 14g to be described later.

The storage unit 13 stores therein various programs executed by the control unit 14. An acquisition unit 14a to be described later stores the event data 13a and the event table 13b into the storage unit 13.

The event data 13a will now be described. The event data 13a is data representing patterns of events that have actually occurred. A description will be made below of a case in which the event data 13a represents patterns of events, each of the patterns indicating information and answers of a respondent who has replied to one questionnaire. However, the event data 13a can employ data that includes various events, not limited to these events.

The patterns of events represented by the event data 13a include an event indicated by an identifier A that "the respondent to the questionnaire is male" and an event indicated by an identifier B that "the respondent to the questionnaire is female". The patterns of events represented by the event data 13a also include an event indicated by an identifier C that "there is no information or answer from the respondent to the questionnaire" and an event indicated by an identifier E that "the respondent to the questionnaire is aged in the thirties". The patterns of events represented by the event data 13a do not include an event indicated by an identifier D to be described later that "the respondent to the questionnaire is aged in the twenties". In the following description, the event indicated by the identifier A will be expressed as an "event A".

In the same way, the event indicated by the identifier B will be expressed as an "event B"; the event indicated by the identifier C will be expressed as an "event C"; the event indicated by the identifier D will be expressed as an "event D"; and the event indicated by the identifier E will be expressed as an "event E". The patterns of events represented by the event data 13a include a pattern in which the event B occurs next to the event A, a pattern in which the event B occurs next to the event A and the event C occurs next to the event B, and a pattern in which the event E occurs next to the event A. The patterns of events represented by the event data 13a also include a pattern in which the event C occurs next to the event B and a pattern in which the event E occurs next to the event B.

Figure 2:
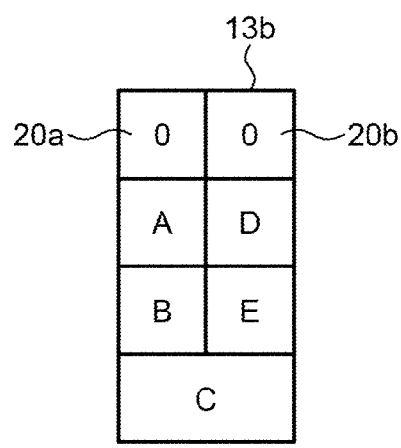
FIG. 2 is a diagram for explaining an example of a process executed by the extraction device according to the first embodiment.

The event table 13b will now be described. The event table 13b registers therein combinations of events that do not occur in the patterns of events represented by the event data 13a. The user generates the event table 13b. FIG. 2 is a diagram illustrating an example of the event table. The example of FIG. 2 illustrates the event table 13b that has been initialized by an initialization unit 14b to be described later. The event table 13b illustrated in FIG. 2 illustrates a case in which the combinations of events that do not occur in the patterns of events represented by the event data 13a are registered in a column-wise manner. The event table 13b of the example of FIG. 2 registers therein a combination of the events A, B, and C in a column-wise manner. The event table 13b of the example of FIG. 2 also registers therein the event D that "the respondent to the questionnaire is aged in the twenties", and the events E and C in a column-wise manner. Specifically, the event table 13b indicates that a combination of the events A and B does not occur in the patterns of events represented by the event data 13a. The event table 13b indicates that a combination of the events A and C does not occur in the patterns of events represented by the event data 13a. The event table 13b indicates that a combination of the events A, B, and C does not occur in the patterns of events represented by the event data 13a. The event table 13b indicates that a combination of the events D and E does not occur in the patterns of events represented by the event data 13a. The event table 13b indicates that a combination of the events D and C does not occur in the patterns of events represented by the event data 13a. The event table 13b indicates that a combination of the events D, E, and C does not occur in the patterns of events represented by the event data 13a.

The event table 13b is provided with counters 20a and 20b corresponding to the respective combinations of events that do not occur in the patterns of events represented by the event data 13a. A counter control unit 14e to be described later controls increase and decrease of values registered in the counters 20a and 20b.

The storage unit 13 is a storage device, such as a semiconductor memory device including a flash memory, a hard disk, or an optical disc. The storage unit 13 is not limited to the above-described types of storage devices, but may be a random access memory (RAM) or a read-only memory (ROM).

The control unit 14 includes an internal memory for storing therein programs defining various processing procedures and control data, and performs various processes using these programs and the control data. As illustrated in FIG. 1, the control unit 14 includes the acquisition unit 14a, an initialization unit 14b, a generation unit 14c, a backtrack processing unit 14d, a counter control unit 14e, the extraction unit 14f, and the display control unit 14g.

The acquisition unit 14a acquires various types of information. For example, when an instruction to acquire the event data 13a from the predetermined server is entered from the input unit 11, the acquisition unit 14a performs the following process based on the instruction. That is, the acquisition unit 14a accesses the predetermined server (not illustrated) via a network (not illustrated) to acquire the event data 13a from the predetermined server. Then, the acquisition unit 14a stores the acquired event data 13a into the storage unit 13. When the event table 13b is supplied from the input unit 11, the acquisition unit 14a acquires the supplied event table 13b, and stores the acquired event table 13b into the storage unit 13.

When the instruction to execute the extraction process is entered from the input unit 11, the acquisition unit 14a acquires the event data 13a and the event table 13b from the storage unit 13.

Figure 3:
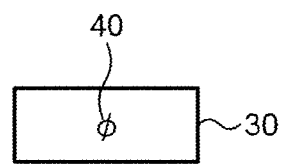
FIG. 3 is a diagram for explaining an example of a process executed by the extraction device according to the first embodiment.

The initialization unit 14b performs various types of initialization. For example, when the acquisition unit 14a has acquired the event data 13a and the event table 13b, the initialization unit 14b sets a pattern that is empty (empty pattern) as the first parent, that is, the root in an enumeration tree. FIG. 3 is a diagram for explaining an example of a process executed by the extraction device according to the first embodiment. As illustrated in the example of FIG. 3, the initialization unit 14b sets an empty pattern 40 as a root pattern 30.

Then, the initialization unit 14b initializes the counters 20a and 20b of the event table 13b by setting the values of the counters 20a and 20b to "0". Next, the initialization unit 14b sets to "1" the value of a threshold to be used in a process performed by the generation unit 14c to be described later to determine whether all of the counters in the columns including selected candidate event e are less than the threshold.

The generation unit 14c generates various patterns. An embodiment of the generation unit 14c will be described. The generation unit 14c first selects the root pattern 30.

Then, the generation unit 14c determines whether there is any candidate event to be added to the selected pattern. In this case, when any one of the predetermined events A to E is unselected in combinations with the selected pattern, the generation unit 14c determines that there is a candidate event to be added to the selected pattern. Note that the present embodiment assumes that the same events are not included in the same pattern. When, instead, none of the predetermined events A to E is unselected in the combinations with the selected pattern, the generation unit 14c determines that there is no candidate event to be added to the selected pattern. For example, in the case illustrated in the example of FIG. 3, when the root pattern 30 is selected, the predetermined events A to E are all unselected in the combinations with the selected pattern. This causes the generation unit 14c to determine that the events A to E to be added to the selected pattern exist. In the case in which display of the display unit 12 is controlled so as to display the pattern using the display control unit 14g, the generation unit 14c determines, in the same way, whether there is a candidate event to be added to the selected pattern. Also, in the case in which the counter control unit 14e has decremented a value of a counter in a column of the event table 13b by one, the generation unit 14c determines, in the same way, whether there is a candidate event to be added to the selected pattern.

When there is a candidate event to be added to the selected pattern, the generation unit 14c selects one unselected event as the candidate event e. For example, in the example of FIG. 3, when the events A to E are to be added to the selected root pattern 30, the generation unit 14c selects the event A having an identifier that is the lowest in alphabetical order among those of the events A to E. Next, the generation unit 14c determines whether all of the counters in the columns including the selected candidate event e are less than the threshold "1" in the event table 13b. For example, in the case illustrated in the example of FIG. 3, when the event A is selected, the generation unit 14c determines that the value "0" of the counter 20a in the column including the selected event A is less than the threshold "1" in the event table 13b illustrated in the example of FIG. 2.

Figure 4:
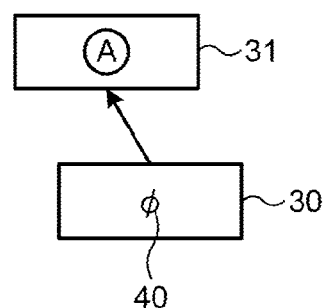
FIG. 4 is a diagram for explaining an example of a process executed by the extraction device according to the first embodiment.

When the generation unit 14c does not determine that all of the counters in the columns including the selected candidate event e are less than the threshold "1", the generation unit 14c performs again the above-described process of determining whether there is a candidate event to be added to the selected pattern, and performs again the processes following that process. When, instead, the generation unit 14c determines that all of the counters in the columns including the selected candidate event e are less than the threshold "1", the generation unit 14c generates a pattern by adding the selected candidate event e to the selected pattern. Then, the generation unit 14c selects the generated pattern. FIG. 4 is a diagram for explaining an example of a process executed by the extraction device according to the first embodiment. For example, as illustrated in the example of FIG. 4, the generation unit 14c generates a pattern 31 by adding the event A serving as the selected candidate event to the selected pattern 30. The generation unit 14c then selects the generated pattern 31. After the pattern is generated, the counter control unit 14e to be described later increments by one the value of the counter in the column including the candidate event e.

In this manner, when all of the counters in the columns including the selected candidate event e are less than the threshold "1", a pattern is generated by adding the selected candidate event e to the selected pattern. When, instead, it is not determined that all of the counters in the columns including the selected candidate event e are less than the threshold "1", no pattern is generated. This is because, when it is not determined that all of the counters in the columns including the selected candidate event e are less than the threshold "1", the combination between the event included in the selected pattern and the selected candidate event e is as follows. That is, the combination between the event included in the selected pattern and the selected candidate event e is a combination of events that does not occur in the patterns of events represented by the event data 13a. In this manner, the present embodiment does not generate a pattern that includes a combination of events that does not occur in the events represented by the event data 13a, that is, a pattern that includes mutually exclusive events. This keeps the present embodiment from performing unnecessary processes, such as a process to calculate the frequency of patterns including combinations of events that do not occur in the patterns of events represented by the event data 13a and a process to determine whether such patterns occur frequently. This, in turn, allows the present embodiment to efficiently extract the patterns. The process may be called "pruning" in which no pattern is generated when it is not determined that all of the counters in the columns including the selected candidate event e are less than the threshold "1".

If, as a result of the determination of whether there is a candidate event to be added to the selected pattern, there is no candidate event to be added, the generation unit 14c determines whether all the patterns are generated except patterns that are no longer generated because of the pruning. If all the patterns are generated except patterns that are no longer generated because of the pruning, the process is terminated.

The backtrack processing unit 14d performs backtracking. For example, when the extraction unit 14f determines that the pattern generated by the generation unit 14c does not occur frequently, the backtrack processing unit 14d deletes the last added event e from the pattern generated by the generation unit 14c to generate a pattern. Then, the backtrack processing unit 14d selects the generated pattern. When the generation unit 14c does not determine that all the patterns are generated except patterns that are no longer generated because of the pruning, the backtrack processing unit 14d also performs the same processing. That is, the generation unit 14c deletes the last added event e from the selected pattern to generate a pattern, and selects the generated pattern.

Figure 5:
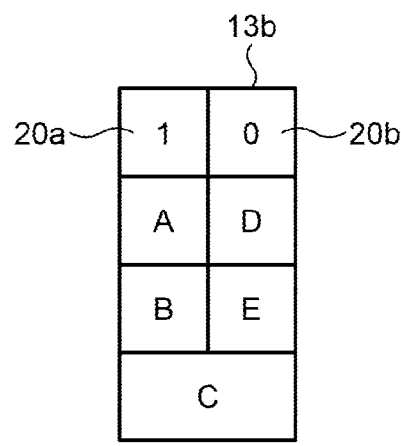
FIG. 5 is a diagram for explaining an example of a process executed by the extraction device according to the first embodiment.

When the generation unit 14c has generated a pattern, the counter control unit 14e increments by one the value of the counter in the column of the event table 13b including the candidate event e having been added when the pattern was generated. FIG. 5 is a diagram for explaining an example of a process executed by the extraction device according to the first embodiment. For example, when the generation unit 14c has generated the pattern 31 illustrated in FIG. 4, the counter control unit 14e increments by one the value of the counter 20a in the column of the event table 13b including the event A that was added when the pattern 31 was generated as illustrated in FIG. 5.

The counter control unit 14e decrements by one the value of the counter in the column of the event table 13b including the event e deleted by the backtrack processing unit 14d.

When the counter control unit 14e has incremented the value of the counter in the column including the candidate event e by one, the extraction unit 14f calculates the frequency of the generated pattern. For example, the extraction unit 14f calculates the frequency to have a value of "1" if the generated pattern occurs in the patterns of events represented by the event data 13a, or to have a value of "0" if the generated pattern does not occur therein. Then, the extraction unit 14f determines whether the generated pattern occurs frequently by determining whether the calculated frequency is "1". If the calculated frequency is "1", the extraction unit 14f determines that the generated pattern occurs frequently. If the calculated frequency is not "1", that is, "0", the extraction unit 14f determines that the generated pattern does not occur frequently. For example, when the generated pattern is the pattern 31 including the event A as illustrated in the example of FIG. 4, the extraction unit 14f calculates the frequency to have a value of "1" because the event A occurs in the patterns of events represented by the event data 13a as described above. Then, the extraction unit 14f determines that the generated pattern 31 occurs frequently because the calculated frequency is "1".

The extraction unit 14f extracts, as a pattern to be displayed, the pattern that is determined to occur frequently. For example, the extraction unit 14f extracts, as the pattern to be displayed, the pattern 31 illustrated in FIG. 4, which is determined to occur frequently.

The display control unit 14g controls the display of the display unit 12 so as to display various types of information. For example, the display control unit 14g controls the display of the display unit 12 so as to display the pattern, such as the pattern 31, extracted by the extraction unit 14f.

A description will next be made of specific examples of processes executed by the extraction device 10 with reference to FIGS. 4 and 5 mentioned above, and FIGS. 6 to 9. FIGS. 6 to 9 are diagrams for explaining examples of processes executed by the extraction device according to the first embodiment.

For example, after the pattern 31 is displayed on the display unit 12, the extraction device 10 selects, in the case illustrated in FIG. 4, the event B that serves as a candidate event to be added to the selected pattern 31. Then, the extraction device 10 selects the event C that serves as a candidate event to be added to the selected pattern 31, because the counter 20a corresponding to the column of the event table 13b including the selected event B has the value of "1", which is not less than the threshold "1".

Figure 6:
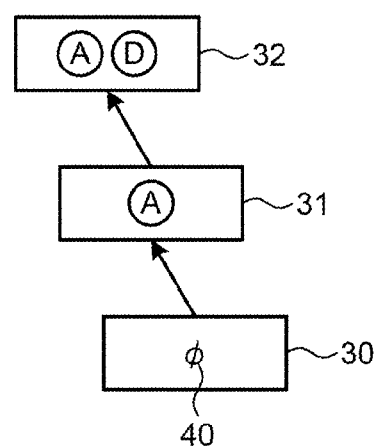
FIG. 6 is a diagram for explaining an example of a process executed by the extraction device according to the first embodiment.
Figure 7:
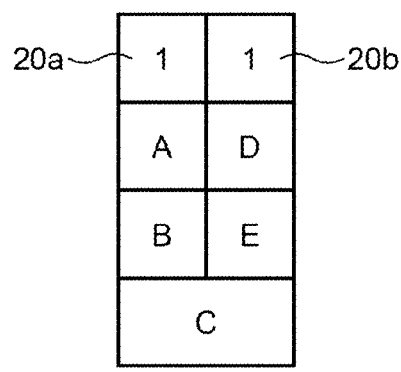
FIG. 7 is a diagram for explaining an example of a process executed by the extraction device according to the first embodiment.

The counter 20a corresponding to the column of the event table 13b including the selected event C has the value of "1", which is not less than the threshold "1". Accordingly, the extraction device 10 selects the event D that serves as a candidate event to be added to the selected pattern 31. The counter 20b corresponding to the column of the event table 13b including the selected event D has the value of "0", which is less than the threshold "1", as illustrated in FIG. 5. Therefore, the extraction device 10 subsequently performs the following process. That is, as illustrated in FIG. 6, the extraction device 10 adds the event D serving as the candidate event to the selected pattern 31 to generate a pattern 32. Then, as illustrated in FIG. 7, the extraction device 10 increments by one the value of the counter 20b of the event table 13b, the counter 20b including the event D in the column thereof.

Figure 8:
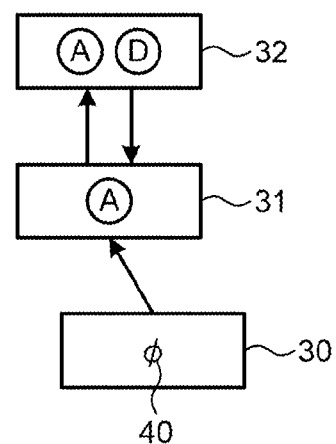
FIG. 8 is a diagram for explaining an example of a process executed by the extraction device according to the first embodiment.
Figure 9:
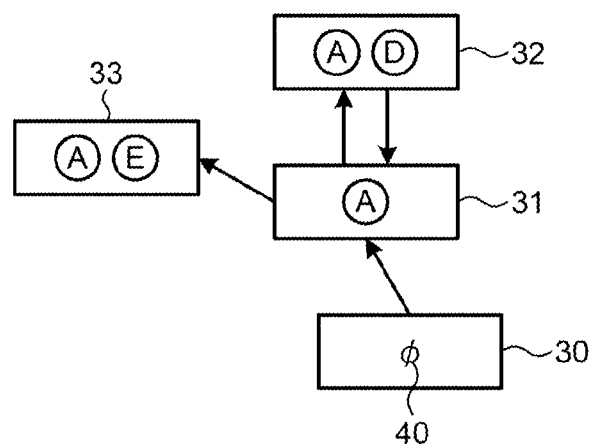
FIG. 9 is a diagram for explaining an example of a process executed by the extraction device according to the first embodiment.

The pattern 32 including the event D does not occur frequently. Therefore, the extraction device 10 deletes the event D from the pattern 32 to generate the pattern 31 as illustrated in FIG. 8, and decrements the value of the counter 20b by one as illustrated in FIG. 5. Then, the extraction device 10 selects the event E that serves as a candidate event to be added to the pattern 31. The extraction device 10 then adds the event E to the pattern 31 to generate a pattern 33 as illustrated in FIG. 9 because the counter 20b corresponding to the column of the event table 13b including the selected event E has the value of "0", which is less than the threshold "1", as illustrated in FIG. 5. No event can be added to the pattern 33. Therefore, the extraction device 10 performs backtracking from the pattern 33, and continues the process. At the time illustrated in FIG. 9, the extraction device 10 has extracted the pattern 31 including the event A and the pattern 33 including the events A and E.

The control unit 14 is an integrated circuit such as an application-specific integrated circuit (ASIC) or a field-programmable gate array (FPGA), or an electronic circuit such as a central processing unit (CPU) or a microprocessing unit (MPU).

Procedure of Processes

Figure 10:
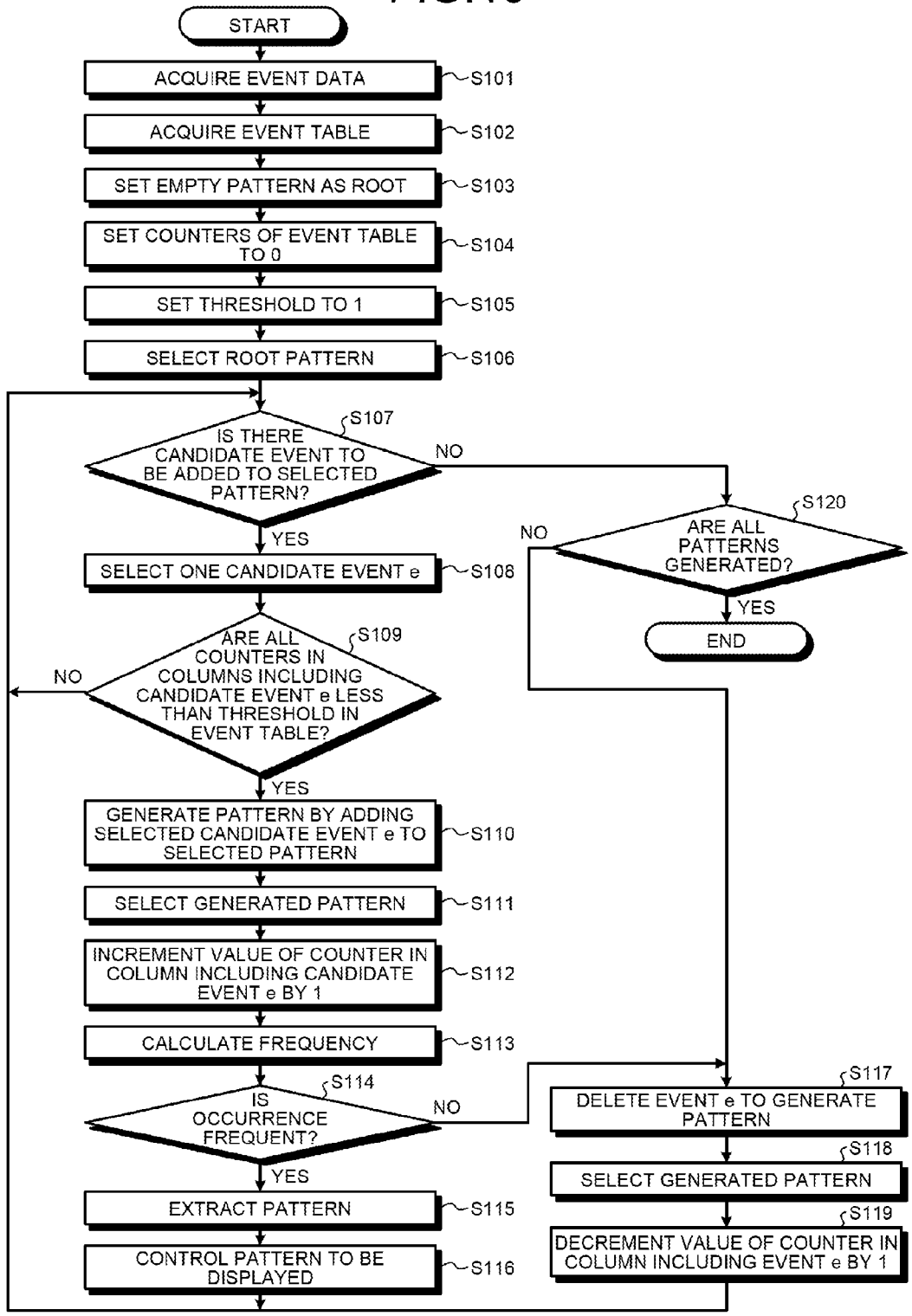
FIG. 10 is a flowchart illustrating the procedure of an extraction process according to the first embodiment.

A description will next be made of the procedure of the processes of the extraction device 10 according to the present embodiment. FIG. 10 is a flowchart illustrating the procedure of the extraction process according to the first embodiment. Various types of timing can be considered as execution timing of the extraction process. For example, the control unit 14 executes the extraction process when an instruction to execute the extraction process is entered from the input unit 11.

As illustrated in FIG. 10, the acquisition unit 14a acquires the event data 13a from the storage unit 13 (S101). Then, the acquisition unit 14a acquires the event table 13b from the storage unit 13 (S102).

Next, the initialization unit 14b sets an empty pattern as the first parent, that is, the root in the enumeration tree (S103). Then, the initialization unit 14b initializes the counters 20a and 20b of the event table 13b by setting the values of the counters 20a and 20b to "0" (S104). Next, the initialization unit 14b sets to "1" the value of the threshold to be used in the process at S109 (S105).

The generation unit 14c selects the root pattern 30 (S106). Then, the generation unit 14c determines whether there is any candidate event to be added to the selected pattern (S107).

If there is a candidate event to be added to the selected pattern (Yes at S107), the generation unit 14c selects one unselected event as the candidate event e (S108). Then, the generation unit 14c determines whether all of the counters in the columns including the selected candidate event e are less than the threshold "1" in the event table 13b (S109).

If at least one of the counters in the columns including the selected candidate event e has a value not less than the threshold "1" (No at S109), the generation unit 14c returns to S107. If, instead, all of the counters in the columns including the selected candidate event e are less than the threshold "1", the generation unit 14c generates a pattern by adding the selected candidate event e to the selected pattern (S110). Then, the generation unit 14c selects the generated pattern (S111).

The counter control unit 14e increments by one the value of the counter in the column of the event table 13b including the candidate event e that was added when the pattern was generated (S112). The extraction unit 14f calculates the frequency of the generated pattern (S113). Then, the extraction unit 14f determines whether the generated pattern occurs frequently by determining whether the calculated frequency is "1" (S114). If the calculated frequency is "1" (Yes at S114), the extraction unit 14f extracts, as a pattern to be displayed, the pattern that is determined to occur frequently (S115). Then, the display control unit 14g controls the display of the display unit 12 so as to display the pattern extracted by the extraction unit 14f (S116), and the process returns to S107.

If the calculated frequency is not "1" (No at S114), the backtrack processing unit 14d deletes the last added event e from the pattern generated by the generation unit 14c to generate a pattern (S117). Then, the backtrack processing unit 14d selects the generated pattern (S118). Thereafter, the counter control unit 14e decrements by one the value of the counter in the column of the event table 13b including the event e deleted by the backtrack processing unit 14d (S119), and the process returns to S107.

If there is no candidate event to be added (No at S107), the generation unit 14c determines whether all the patterns are generated except patterns that are no longer generated because of the pruning (S120). If all the patterns are generated except patterns that are no longer generated because of the pruning (Yes at S120), the process is terminated. If any pattern is not generated among all the patterns except patterns that are no longer generated because of the pruning (No at S120), the process proceeds to S117.

As described above, when a new pattern is to be generated by adding an event to a pattern including an event or events, the extraction device 10 according to the present embodiment performs the following process based on the event table 13b stored in the storage unit 13 and indicating combinations of mutually exclusive events. That is, the extraction device 10 generates a new pattern if the number of occurrence, in the new pattern, of each of the events included in the combinations is not more than the threshold "1". Then, based on the event data 13a stored in the storage unit 13 and including a plurality of events, the extraction device 10 calculates the frequency at which one or more generated patterns occur in the event data 13a. Next, the extraction device 10 extracts a new pattern whose frequency satisfies a predetermined condition. Thereafter, the extraction device 10 adds a new event to the extracted new pattern. Consequently, the extraction device 10 does not generate a pattern that includes a combination of events that does not occur in the events represented by the event data 13a, that is, a pattern that includes mutually exclusive events. This keeps the extraction device 10 from performing unnecessary processes, such as the process to calculate the frequency of patterns including combinations of events that do not occur in the patterns of events represented by the event data 13a and the process to determine whether such patterns occur frequently. This, in turn, allows the extraction device 10 according to the present embodiment to efficiently extract the patterns.

Second Embodiment

Configuration of Extraction Device

Figure 11:
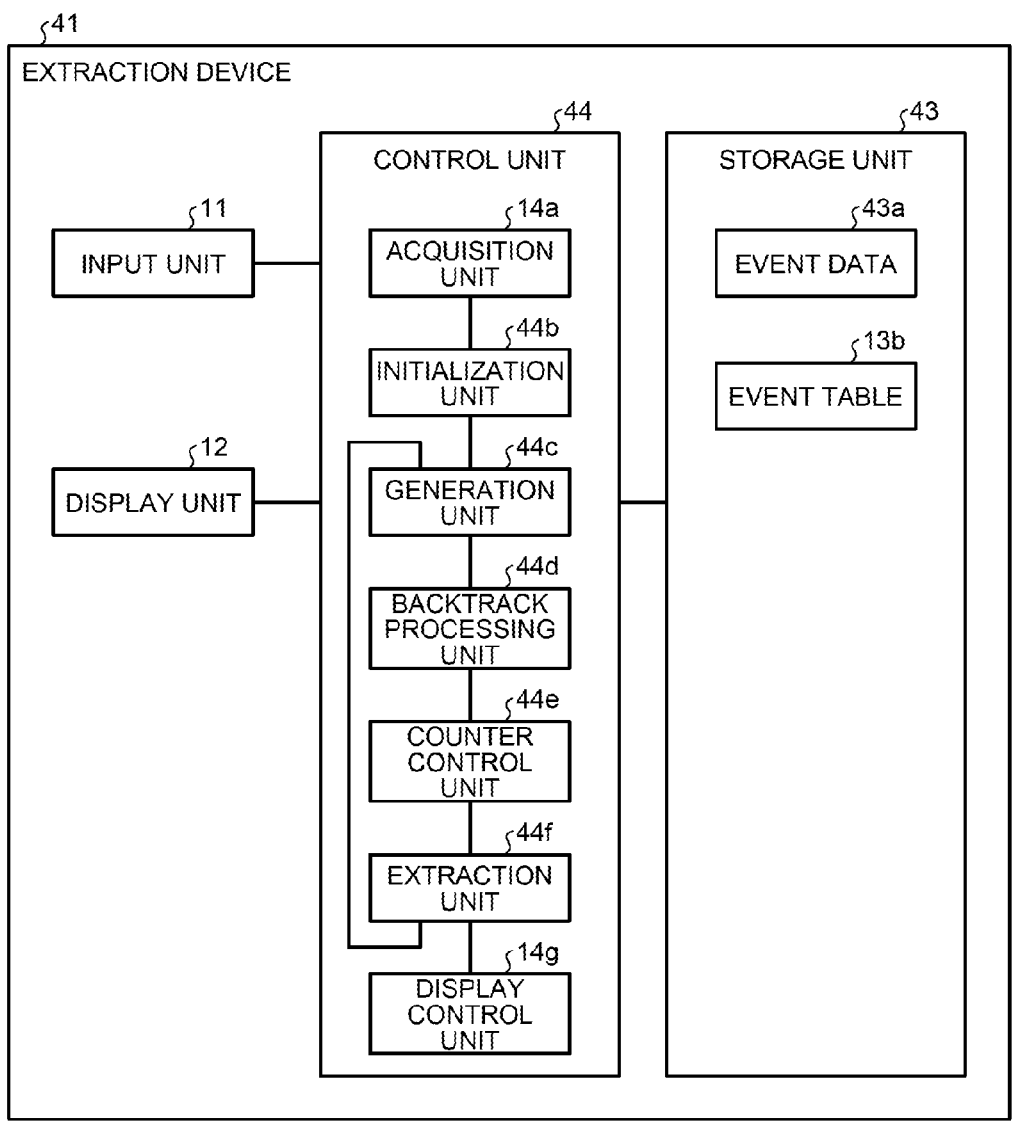
FIG. 11 is a diagram illustrating an example of a functional configuration of an extraction device according to a second embodiment of the present invention.

A description will next be made of an extraction device according to a second embodiment of the present invention. As illustrated in FIG. 11, this extraction device 41 includes a storage unit 43 and a control unit 44. The storage unit 43 differs from the storage unit 13 according to the first embodiment illustrated in FIG. 1 in that the storage unit 43 stores therein event data 43a instead of the event data 13a as memory contents. The control unit 44 differs from the control unit 14 according to the first embodiment illustrated in FIG. 1 in that the control unit 44 includes an initialization unit 44b, a generation unit 44c, a backtrack processing unit 44d, a counter control unit 44e, and an extraction unit 44f. Note that, hereinafter, the same numerals as those in FIG. 1 will be given to units and devices performing the same functions as those of the first embodiment above, and descriptions thereof may be omitted.

The input unit 11 enters information into the control unit 44. For example, the input unit 11 accepts an instruction from the user, and enters, into the control unit 44, an instruction to execute the extraction process. The input unit 11 also accepts an instruction from the user, and enters, into the control unit 44, an instruction to acquire the event data 43a to be described later from a predetermined server. The input unit 11 accepts an operation from the user, and supplies the event table 13b into the control unit 44. A keyboard and a mouse are examples of devices of the input unit 11.

The display unit 12 displays thereon various types of information. For example, the display unit 12 displays thereon an episode extracted by the extraction unit 44f to be described later under the control of the display control unit 14g to be described later.

The storage unit 43 stores therein various programs executed by the control unit 44. The acquisition unit 14a to be described later stores the event data 43a and the event table 13b into the storage unit 43.

The event data 43a will now be described. The event data 43a is data in which an event that has actually occurred is associated with the time at which the event occurred. A description will be made below of a case in which the event data 43a includes a plurality of pieces of data each of which represents a pattern of events indicating information and answers of a respondent who has replied to one questionnaire. However, the event data 43a is not limited to that case. The event data 43a can employ data that includes various types of events. To describe it with a specific example, the event data 43a includes data that represents patterns of events indicating information and answers of respondents who have replied to a plurality of questionnaires that differ between times of occurrence. Therefore, although the above-mentioned pattern of a combination of mutually exclusive events does not occur in the event data 13a representing a pattern of events indicating information and answers of a respondent who has replied to one questionnaire, the pattern of a combination of mutually exclusive events can occur in the event data 43a.

Hereinafter, the patterns of events represented by the event data 43a include the events A, B, C, and E, but do not include the event D. The patterns of events represented by the event data 43a include a pattern in which the event B occurs next to the event A, a pattern in which the event B occurs next to the event A and the event C occurs next to the event B, and a pattern in which the event E occurs next to the event A. The patterns of events represented by the event data 43a also include a pattern in which the event C occurs next to the event B and a pattern in which the event E occurs next to the event B.

The storage unit 43 is a storage device such as a semiconductor memory device including a flash memory, a hard disk, or an optical disc. The storage unit 43 is not limited to the above-described types of storage devices, but may be a random access memory (RAM) or a read-only memory (ROM).

The control unit 44 includes an internal memory for storing therein programs defining various processing procedures and control data, and performs various processes using these programs and the control data. The control unit 44 includes the acquisition unit 14a, the initialization unit 44b, the generation unit 44c, the backtrack processing unit 44d, the counter control unit 44e, the extraction unit 44f, and the display control unit 14g.

The acquisition unit 14a acquires various types of information. For example, when an instruction to acquire the event data 43a from the predetermined server is entered from the input unit 11, the acquisition unit 14a performs the following process based on the instruction. That is, the acquisition unit 14a accesses the predetermined server (not illustrated) via a network (not illustrated) to acquire the event data 43a from the predetermined server. Then, the acquisition unit 14a stores the acquired event data 43a into the storage unit 43. When the event table 13b is supplied from the input unit 11, the acquisition unit 14a acquires the supplied event table 13b, and stores the acquired event table 13b into the storage unit 43.

When an instruction to execute the extraction process is entered from the input unit 11, the acquisition unit 14a acquires the event data 43a and the event table 13b from the storage unit 43.

Figure 12:
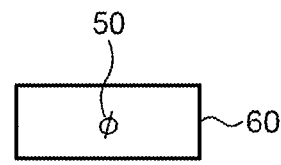
FIG. 12 is a diagram for explaining an example of a process executed by the extraction device according to the second embodiment.

The initialization unit 44b performs various types of initialization. For example, when the acquisition unit 14a has acquired the event data 43a and the event table 13b, the initialization unit 44b sets an episode that is empty (empty episode) as the first parent, that is, the root in the enumeration tree. Here, the episode is expressed in a form of a directed graph representing an order (occurrence order) in which events occur. For example, the episode includes a plurality of parts. Each of the parts includes events. Each of the parts is given an order. A description will now be made of a relation between events included in an N-th part and events included in an (N+1)-th part included in the episode. In the relation between the events included in the N-th part and the events included in the (N+1)-th part, the events included in the (N+1)-th part occur after all of the events included in the N-th part occur. FIG. 12 is a diagram for explaining an example of a process executed by the extraction device according to the second embodiment. As illustrated in the example of FIG. 12, the initialization unit 44b sets an empty episode 50 as a root episode 60.

Then, the initialization unit 44b initializes the counters 20a and 20b of the event table 13b by setting the values of the counters 20a and 20b to "0". Next, the initialization unit 44b sets, to a value described below, the value of a threshold to be used in a process performed by the generation unit 44c to be described later to determine whether all of the counters in the columns including selected candidate event e are less than the threshold. That is, the initialization unit 44b sets the value of the threshold to a value of a window width that is used when an episode is extracted and that is a temporal width used in searching for an event pattern of the event data 43a. The window width is, for example, "2" in the case of attempting to extract event patterns that have occurred during time (2 to 3) from time "2" to time "3". Although a case will be described below in which the window width is "2", the window width is not limited to this.

The generation unit 44c generates various episodes. An embodiment of the generation unit 44c will be described. The generation unit 44c first selects the root episode 50.

Then, the generation unit 44c determines whether there are a candidate event to be added to the selected episode and a candidate part to which the event is to be added. In the present embodiment, a case will be described in which the empty episode 50 includes a first part and a second part. The empty episode 50 includes the two parts, and therefore, a descendant episode of the empty episode 50 also includes the two parts. In this case, when there is any unselected event among the predetermined events A to E in a combination with either of the parts of the selected episode, the generation unit 44c determines that there are a candidate event to be added to the selected episode and a candidate part to which the event is to be added. Note that the present embodiment assumes that the same events are not included in the same part. When, instead, there is no unselected event among the predetermined events A to E in either of the combinations with the parts of the selected episode, the generation unit 44c determines that there is no candidate event to be added to the selected episode. For example, when the root episode 60 illustrated in FIG. 12 is selected, there are unselected events A to E among the predetermined events A to E in any combination with either of the parts of the episode 60. This causes the generation unit 44c to determine that there are the events A to E to be added to a part of the selected episode 60 and a part (the first part and the second part) to which the events are to be added. In the case in which display of the display unit 12 is controlled so as to display the episode by the display control unit 14g, the generation unit 44c determines, in the same way, whether there are a candidate event to be added to the selected episode and a candidate part to which the event is to be added. Also, in the case in which the counter control unit has decremented the value of the counter in the column of the event table 13b by one, the generation unit 44c determines, in the same way, whether there are a candidate event to be added to the selected episode and a part to which the event is to be added.

When there are a candidate event to be added to the selected episode and a part to which the event is to be added, the generation unit 44c selects one unselected event as the candidate event e and selects one candidate part. For example, in the example of FIG. 12, when the events A to E to be added to the selected episode 60 and the first and the second parts to which the events are to be added exist, the generation unit 44c selects the event A having an identifier that is the lowest in alphabetical order among those of the events A to E. In addition, the generation unit 44c selects the first part that has a smaller order number between the first and the second parts to which the event can be added. Next, the generation unit 44c determines whether all of the counters in the columns including the selected candidate event e are less than a threshold "2" in the event table 13b. For example, in the case illustrated in the example of FIG. 13, when the event A is selected, the generation unit 44c determines that the value "0" of the counter 20a in the column including the selected event A is less than the threshold "2" in the event table 13b illustrated in the above example of FIG. 2.

Figure 13:
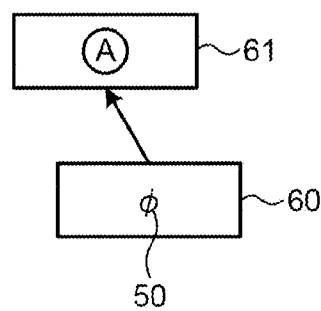
FIG. 13 is a diagram for explaining an example of a process executed by the extraction device according to the second embodiment.

When at least one of the counters in the columns including the selected candidate event e has a value not less than the threshold "2", the generation unit 44c performs again the above-described process to determine whether there are a candidate event to be added to the selected episode and a candidate part to which the event is to be added. Then, the generation unit 44c performs again the processes following that process. When, instead, all of the counters in the columns including the selected candidate event e are less than the threshold "2", the generation unit 44c generates an episode by adding the selected candidate event e to the selected candidate part of the selected episode. Then, the generation unit 44c selects the generated episode. FIG. 13 is a diagram for explaining an example of a process executed by the extraction device according to the second embodiment. For example, as illustrated in the example of FIG. 13, the generation unit 44c generates an episode 61 by adding the event A that is the selected candidate event to the selected candidate part of the selected episode 60. The generation unit 44c then selects the generated episode 61. After the episode is generated, the counter control unit 44e to be described later increments by one the value of the counter in the column including the candidate event e.

In this manner, when all of the counters in the columns including the selected candidate event e are less than the threshold "2", an episode is generated by adding the selected candidate event e to the selected part of the selected episode. When the present embodiment does not determine that all of the counters in the columns including the selected candidate event e are less than the threshold "2", no new episode is generated. That is, as described above, the event data 43a includes data that represents patterns of events indicating information and answers of respondents who have replied to a plurality of questionnaires. Therefore, a combination of events that does not occur in the patterns of events represented by the event data 13a occurs in the patterns of events represented by the event data 43a. Therefore, the present embodiment does not generate a pattern that includes a number (larger than the size of the window width) of combinations of events that do not occur in the events represented by the event data 43a, that is, a pattern that includes mutually exclusive events. This keeps the present embodiment from performing unnecessary processes, such as the process to calculate the frequency of patterns including combinations of events that do not occur in the patterns of events represented by the event data 43a and the process to determine whether such patterns occur frequently. This, in turn, allows the present embodiment to efficiently extract the patterns. The process may be called "pruning" in which no episode is generated when it is not determined that all of the counters in the columns including the selected candidate event e are less than the threshold "2".

If, as a result of the determination of whether there are a candidate event to be added to the selected episode and a candidate part to which the event is to be added, there is no candidate event to be added or no candidate part to which the event is to be added, the generation unit 44c performs the following process. That is, the generation unit 44c determines whether all the episodes are generated except episodes that are no longer generated because of the pruning. If all the episodes are generated except episodes that are no longer generated because of the pruning, the process is terminated.

The backtrack processing unit 44d performs backtracking. For example, when the extraction unit 44f determines that an episode generated by the generation unit 44c does not occur frequently, the backtrack processing unit 44d deletes the last added event e from the episode generated by the generation unit 44c to generate an episode. Then, the backtrack processing unit 44d selects the generated episode. When the generation unit 44c does not determine that all the episodes are generated except episodes that are no longer generated because of the pruning, the backtrack processing unit 44d also performs the same processing. That is, the backtrack processing unit 44d deletes the last added event e from the selected episode to generate an episode, and selects the generated episode.

Figure 14:
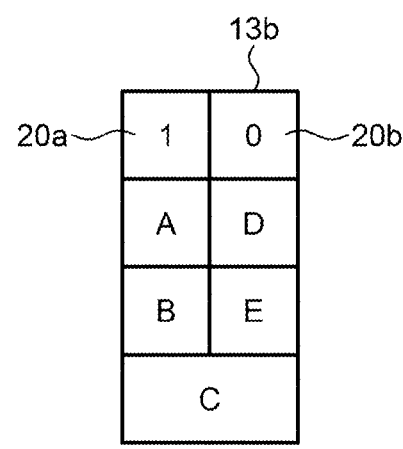
FIG. 14 is a diagram for explaining an example of a process executed by the extraction device according to the second embodiment.

When the generation unit 44c has generated an episode, the counter control unit 44e increments by one the value of the counter in the column of the event table 13b including the candidate event e that was added when the episode was generated. FIG. 14 is a diagram for explaining an example of a process executed by the extraction device according to the second embodiment. For example, when the generation unit 44c has generated the episode 61 illustrated in FIG. 13, the counter control unit 44e increments by one the value of the counter 20a in the column of the event table 13b including the event A that was added when the episode 61 was generated as illustrated in FIG. 14.

The counter control unit 44e decrements by one the value of the counter in the column of the event table 13b including the event e deleted by the backtrack processing unit 44d.

When the counter control unit 44e has incremented the value of the counter in the column including the candidate event e by one, the extraction unit 44f calculates the frequency of the generated episode. For example, the extraction unit 44f calculates, as the frequency, a value of "1" if a minimal occurrence of the generated episode exists, or a value of "0" if no minimal occurrence of the generated episode exists. Here, the minimal occurrence refers to the minimum time interval during which events ranging from the event in the part at the start of the episode to the event in the part at the end of the episode exist in a pattern of events represented by the event data 43a. The frequency is also called "binary frequency". The generation unit 44c determines whether the calculated frequency is "1". If the calculated frequency is "1", the generation unit 44c determines that the episode occurs frequently. If the calculated frequency is not "1", that is, "0", the generation unit 44c determines that the episode does not occur frequently.

Although a case will be described below in which the device disclosed herein calculates the "binary frequency" as the frequency, the device disclosed herein is not limited to this. For example, if the frequency is such that the frequency of children is not more than the frequency of parents in the enumeration tree, the device disclosed herein can calculate a frequency other than the binary frequency, and, based on the calculated frequency, can determine whether the episode occurs frequently. A "window frequency" is an example of such a frequency. The "window frequency" refers to the number of intervals including the minimal occurrence among a predetermined set of intervals, or the number of intervals including the minimal occurrence among a set of a plurality of intervals in which adjacent intervals partially overlap each other. In the case of calculating the "window frequency" as the frequency, the extraction unit 44f can determine whether the episode occurs frequently by determining whether the "window frequency" of the episode is a predetermined threshold or more.

A "non-overlapping minimal occurrence frequency" is another example. The "non-overlapping minimal occurrence frequency" refers to the maximum number of minimal occurrences that do not overlap each other in time (that do not include the same time as each other). In the case of calculating the "non-overlapping minimal occurrence frequency" as the frequency, the extraction unit 44f can determine whether the episode occurs frequently by determining whether the "non-overlapping minimal occurrence frequency" of the episode is a predetermined threshold or more. The extraction unit 44f extracts, as an episode to be displayed, the episode that is determined to occur frequently. For example, the extraction unit 44f extracts, as the episode to be displayed, the episode 61 illustrated in FIG. 13 that is determined to occur frequently.

The display control unit 14g controls the display of the display unit 12 so as to display various types of information. For example, the display control unit 14g controls the display of the display unit 12 so as to display the episode, such as the episode 61, extracted by the extraction unit 44f.

Figure 15:
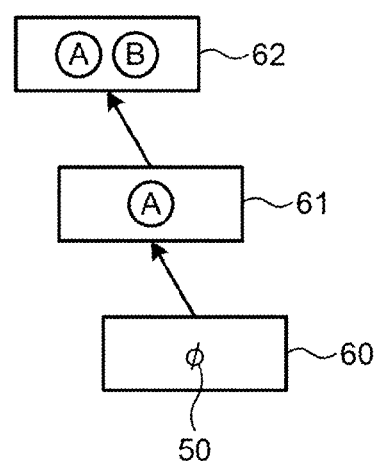
FIG. 15 is a diagram for explaining an example of a process executed by the extraction device according to the second embodiment.
Figure 16:
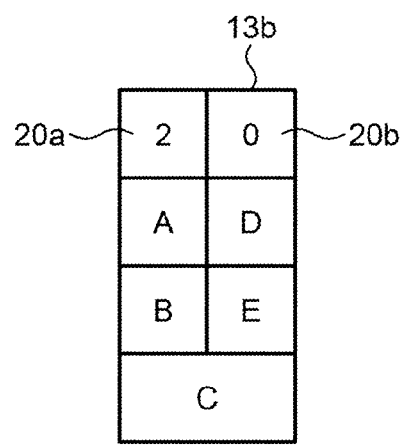
FIG. 16 is a diagram for explaining an example of a process executed by the extraction device according to the second embodiment.

A description will next be made of specific examples of processes executed by the extraction device 41 with reference to FIGS. 12 to 14 mentioned above, and FIGS. 15 to 24. FIGS. 15 to 24 are diagrams for explaining examples of processes executed by the extraction device according to the second embodiment. For example, after the episode 61 is displayed on the display unit 12, the extraction device 41 selects, in the case illustrated in FIG. 13, the event B that serves as a candidate event to be added to the selected episode 61 and the (first or second) part to which the event is to be added. Here, the value of the counter 20a corresponding to the column of the event table 13b including the selected event B is "1", which is less than the threshold "2". Accordingly, as illustrated in FIG. 15, the extraction device 41 adds the event B to the selected part of the selected episode 61 to generate an episode 62. Then, as illustrated in FIG. 16, the extraction device 41 increments by one the value of the counter 20a in the column of the event table 13b including the event B. The extraction device 41 then calculates the frequency of the episode 62 to be "1", and determines that the episode 62 occurs frequently. Next, the extraction device 41 extracts the episode 62, and controls the display unit 12 so as to display the extracted episode 62. Thereafter, the extraction device 41 selects the event C that serves as a candidate event to be added to the episode 62, and the part to which the event is to be added.

Figure 17:
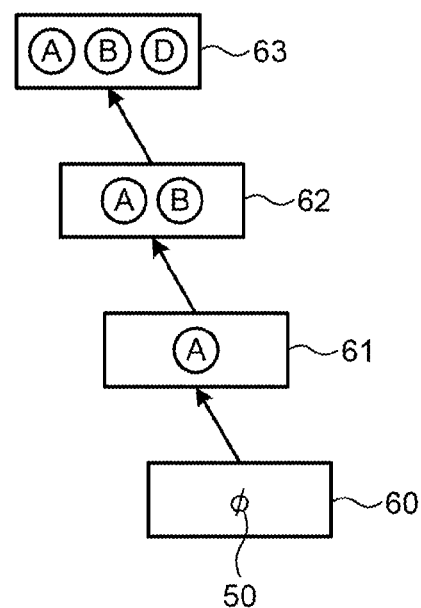
FIG. 17 is a diagram for explaining an example of a process executed by the extraction device according to the second embodiment.
Figure 18:
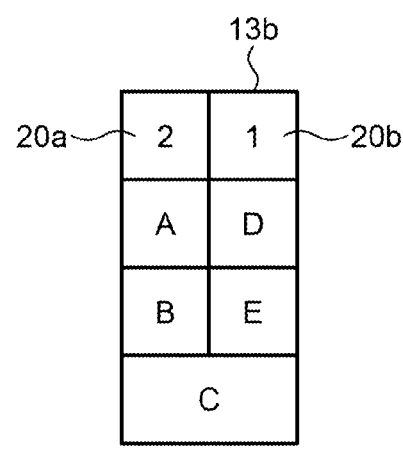
FIG. 18 is a diagram for explaining an example of a process executed by the extraction device according to the second embodiment.
Figure 19:
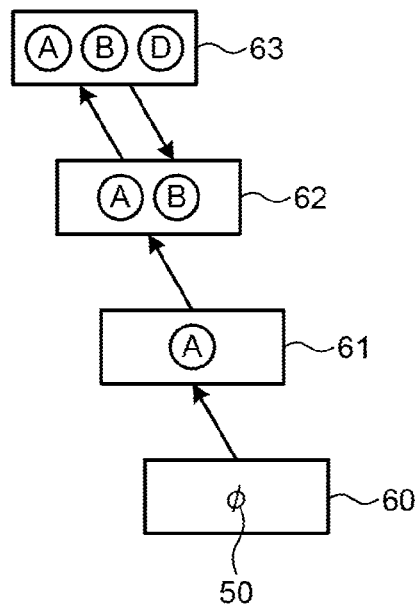
FIG. 19 is a diagram for explaining an example of a process executed by the extraction device according to the second embodiment.

However, as illustrated in FIG. 16, the value "2" of the counter 20a corresponding to the column including the event C is not less than the threshold "2". Accordingly, the extraction device 41 selects the event D that serves as a candidate event to be added to the episode 62, and the part to which the event is to be added. As illustrated in FIG. 16, the value "0" of the counter 20b corresponding to the column including the event D is less than the threshold "2". Therefore, the extraction device 41 performs the following process. That is, as illustrated in FIG. 17, the extraction device 41 adds the event D to the selected part of the episode 62 to generate an episode 63. Next, as illustrated in FIG. 18, the extraction device 41 increments by one the value of the counter 20b in the column of the event table 13b including the candidate event D that was added when the episode 63 was generated. The extraction device 41 then calculates the frequency of the episode 63 to be "0", and determines that the episode 63 does not occur frequently. Then, as illustrated in FIG. 19, the extraction device 41 deletes the last added event D from the episode 63 to generate the episode 62. As illustrated in FIG. 16, the extraction device 41 decrements by one the value of the counter 20b in the column of the event table 13b including the deleted event D.

Figure 20:
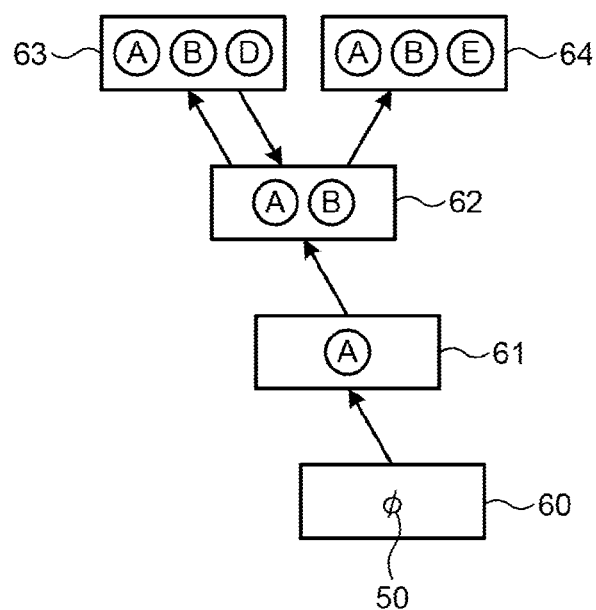
FIG. 20 is a diagram for explaining an example of a process executed by the extraction device according to the second embodiment.
Figure 21:
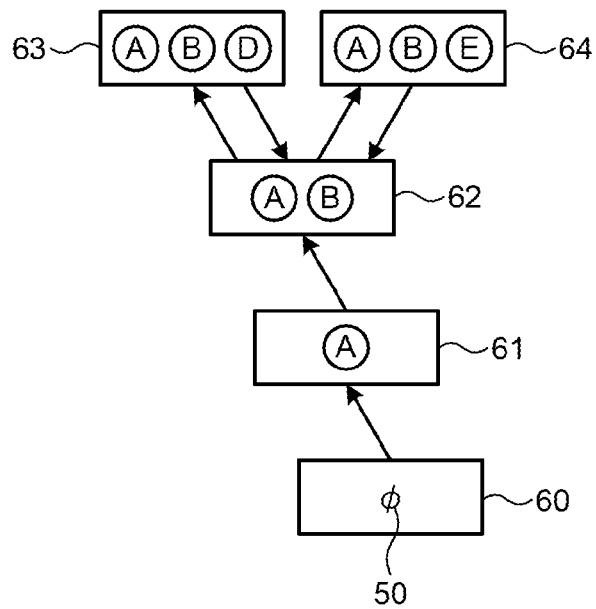
FIG. 21 is a diagram for explaining an example of a process executed by the extraction device according to the second embodiment.

Then, the extraction device 41 selects the event E that serves as a candidate event to be added to the episode 62, and the part to which the event is to be added. As illustrated in FIG. 16, the value "0" of the counter 20b corresponding to the column of the event table 13b including the selected event E is less than the threshold "2". Accordingly, the extraction device 41 adds the event E to the selected part of the episode 62 to generate an episode 64 as illustrated in FIG. 20. Next, as illustrated in FIG. 18, the extraction device 41 increments by one the value of the counter 20b in the column of the event table 13b including the candidate event E that was added when the episode 64 was generated. The extraction device 41 then calculates the frequency of the episode 64 to be "1", and determines that the episode 64 occurs frequently. Next, the extraction device 41 extracts the episode 64, and controls the display unit 12 so as to display the extracted episode 64. There is no candidate event to be added to the episode 64. Therefore, as illustrated in FIG. 21, the extraction device 41 generates the episode 62 by deleting the event E last added to the episode 64. As illustrated in FIG. 16, the extraction device 41 decrements by one the value of the counter 20b in the column of the event table 13b including the deleted event E.

Figure 22:
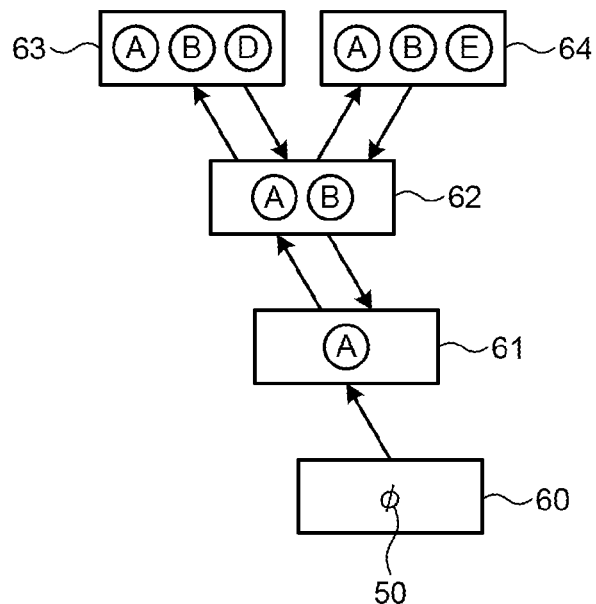
FIG. 22 is a diagram for explaining an example of a process executed by the extraction device according to the second embodiment.
Figure 23:
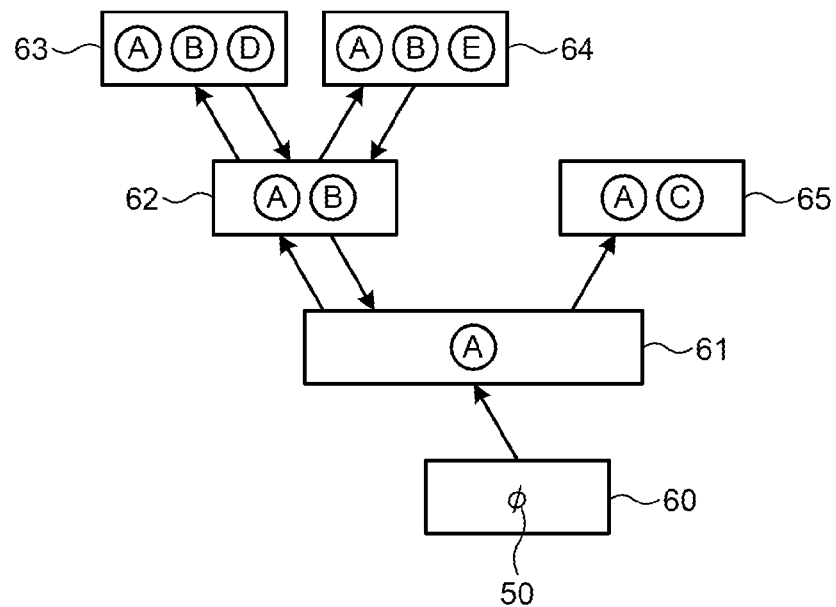
FIG. 23 is a diagram for explaining an example of a process executed by the extraction device according to the second embodiment.

There is no candidate event to be added to the episode 62. Therefore, as illustrated in FIG. 22, the extraction device 41 generates the episode 61 by deleting the event B last added to the episode 62 from the episode 62. As illustrated in FIG. 14, the extraction device 41 decrements by one the value of the counter 20a in the column of the event table 13b including the deleted event B. Next, the extraction device 41 selects the event C that serves as a candidate event to be added to the episode 61, and the part to which the event is to be added. As illustrated in FIG. 14, the counters 20a and 20b corresponding to the columns of the event table 13b including the selected event C have values "1" and "0", respectively, which are less than the threshold "2". Accordingly, as illustrated in FIG. 23, the extraction device 41 adds the event C to the selected part of the episode 61 to generate an episode 65.

Figure 24:
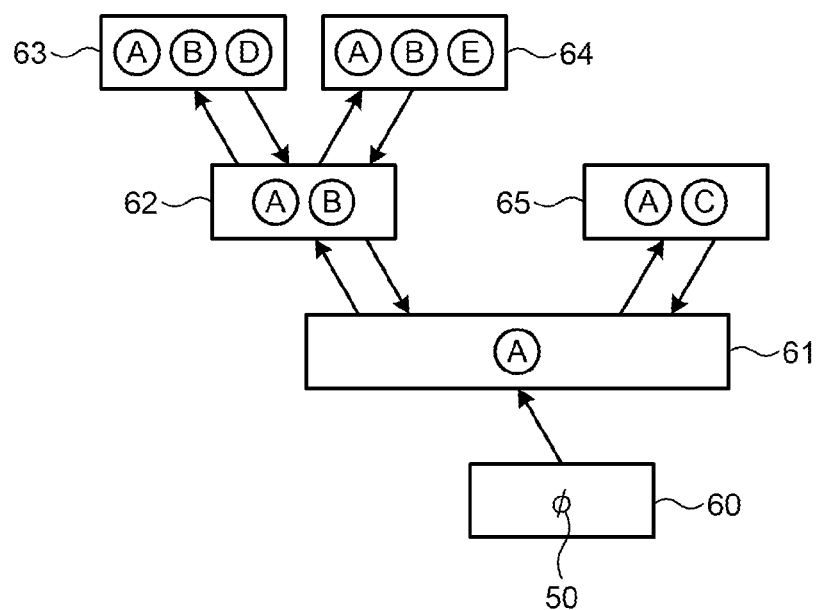
FIG. 24 is a diagram for explaining an example of a process executed by the extraction device according to the second embodiment.

Next, as illustrated in FIG. 18, the extraction device 41 increments by one each of the values of the counters 20a and 20b corresponding to the columns of the event table 13b including the event C that was added when the episode 65 was generated. The extraction device 41 then calculates the frequency of the episode 65 to be "0", and determines that the episode 65 does not occur frequently. Then, as illustrated in FIG. 24, the extraction device 41 generates the episode 61 by deleting the event C last added to the episode 65 from the episode 65. Then, as illustrated in FIG. 14, the extraction device 41 decrements by one each of the values of the counters 20a and 20b in the columns of the event table 13b including the deleted event C. The extraction device 41 subsequently continues performing various processes.

The control unit 44 is an integrated circuit such as an ASIC or an FPGA, or an electronic circuit such as a CPU or an MPU.

Procedure of Processes

Figure 25:
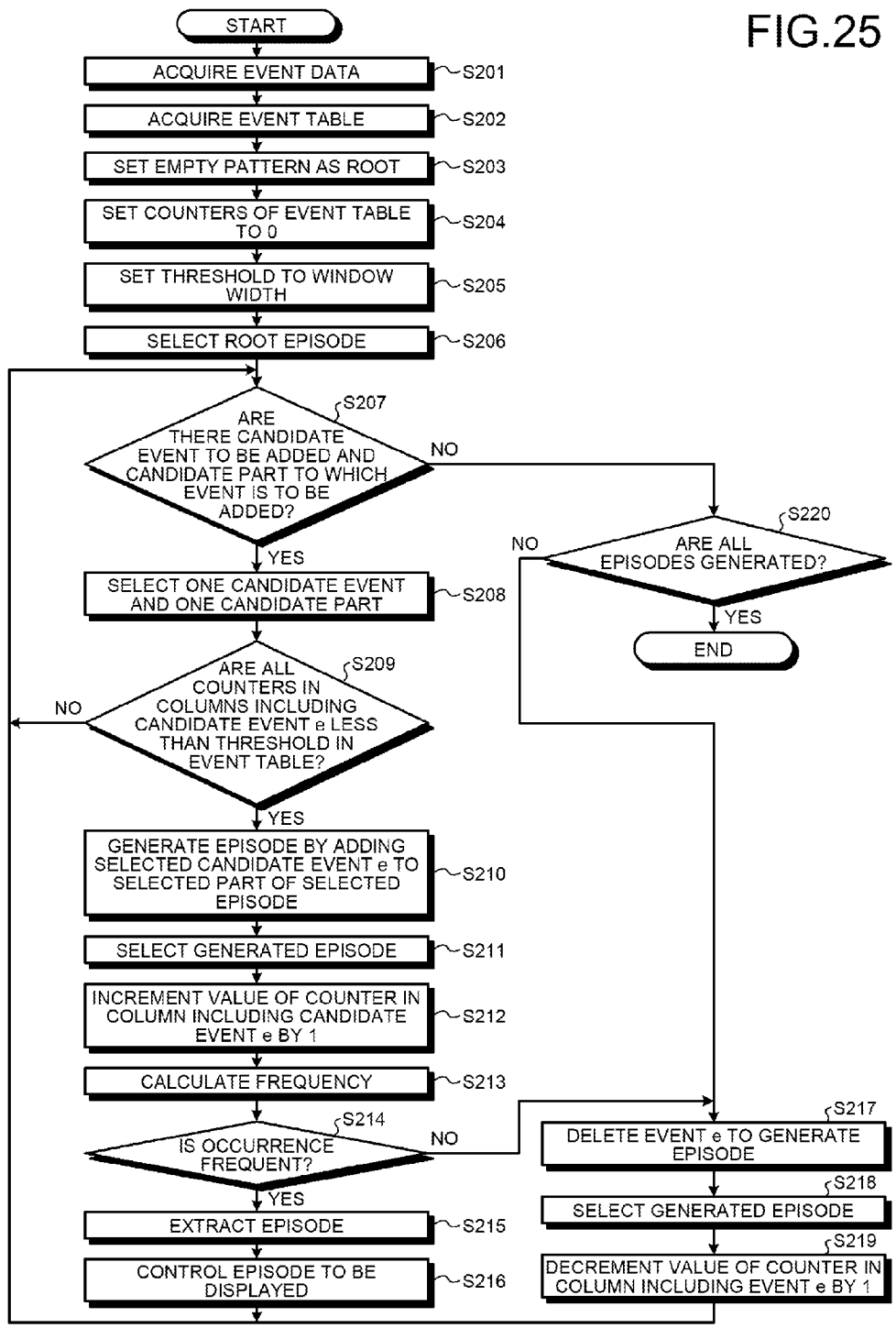
FIG. 25 is a flowchart illustrating the procedure of an extraction process according to the second embodiment.

A description will next be made of the procedure of the processes of the extraction device 41 according to the present embodiment. FIG. 25 is a flowchart illustrating the procedure of the extraction process according to the second embodiment. Various types of timing can be considered as execution timing of the extraction process. For example, the control unit 44 executes the extraction process when an instruction to execute the extraction process is entered from the input unit 11.

As illustrated in FIG. 25, the acquisition unit 14a acquires the event data 43a from the storage unit 43 (S201). Next, the acquisition unit 14a acquires the event table 13b from the storage unit 43 (S202).

Next, the initialization unit 44b sets an empty episode as the first parent, that is, the root in the enumeration tree (S203). Then, the initialization unit 44b initializes the counters 20a and 20b of the event table 13b by setting the values of the counters 20a and 20b to "0" (S204). Next, the initialization unit 44b sets the value of the threshold to be used in the process at S209 to the window width (S205).

The generation unit 44c selects the root episode 60 (S206). Then, the generation unit 44c determines whether there are a candidate event to be added to the selected episode and a candidate part to which the event is to be added (S207).

If there are a candidate event to be added to the selected episode and a candidate part (Yes at S207), the generation unit 44c selects one unselected event as the candidate event e and selects one candidate part (S208). Next, the generation unit 44c determines whether all of the counters in the columns including the selected candidate event e are less than the threshold "2" in the event table 13b (S209).

If at least one of the counters in the columns including the selected candidate event e has a value not less than the threshold "2" (No at S209), the generation unit 44c returns to S207. If, instead, all of the counters in the columns including the selected candidate event e are less than the threshold "2" (Yes at S209), the generation unit 44c generates an episode by adding the selected candidate event e to the selected episode (S210). Then, the generation unit 44c selects the generated episode (S211).

The counter control unit 44e increments by one the value of the counter in the column of the event table 13b including the candidate event e that was added when the selected episode was generated (S212). The extraction unit 44f calculates the frequency of the generated episode (S213). Then, the extraction unit 44f determines whether the generated episode occurs frequently by determining whether the calculated frequency is "1" (S214). If the calculated frequency is "1" (Yes at S214), the extraction unit 44f extracts, as an episode to be displayed, the episode that is determined to occur frequently (S215). Then, the display control unit 14g controls the display of the display unit 12 so as to display the episode extracted by the extraction unit 44f (S216), and the process returns to S207.

If the calculated frequency is not "1" (No at S214), the backtrack processing unit 44d deletes the last added event e from the episode generated by the generation unit 44c to generate an episode (S217). Then, the backtrack processing unit 44d selects the generated episode (S218). Thereafter, the counter control unit 44e decrements by one the value of the counter in the column of the event table 13b including the event e deleted by the backtrack processing unit 44d (S219), and the process proceeds to S207.

If there is no candidate event to be added or no candidate part to which the event is to be added (No at S207), the generation unit 44c determines whether all the episodes are generated except episodes that are no longer generated because of the pruning (S220). If all the episodes are generated except episodes that are no longer generated because of the pruning (Yes at S220), the process is terminated. If any episode is not generated among all the episodes except episodes that are no longer generated because of the pruning (No at S220), the process proceeds to S217.

As described above, the extraction device 41 according to the present embodiment performs the following process when generating a new episode. That is, the extraction device 41 generates a new pattern if the number of occurrence, in the new episode, of each of the events included in the combinations of mutually exclusive events indicated by the event table 13b is not more than the threshold "2" determined based on a predetermined window width. Then, based on the events associated with occurrence times thereof within the window width, the extraction device 41 calculates the frequency. In this manner, the extraction device 41 does not generate an episode that includes a number (larger than the size of the window width) of events included in combinations of events that do not occur in the events represented by the event data 43a. This keeps the extraction device 41 from performing unnecessary processes, such as a process to calculate the frequency of episodes including combinations of events that do not occur in the patterns of events represented by the event data 43a and a process to determine whether such episodes occur frequently. This, in turn, allows the extraction device 41 to efficiently extract the episodes.

Third Embodiment

Configuration of Extraction Device

Figure 26:
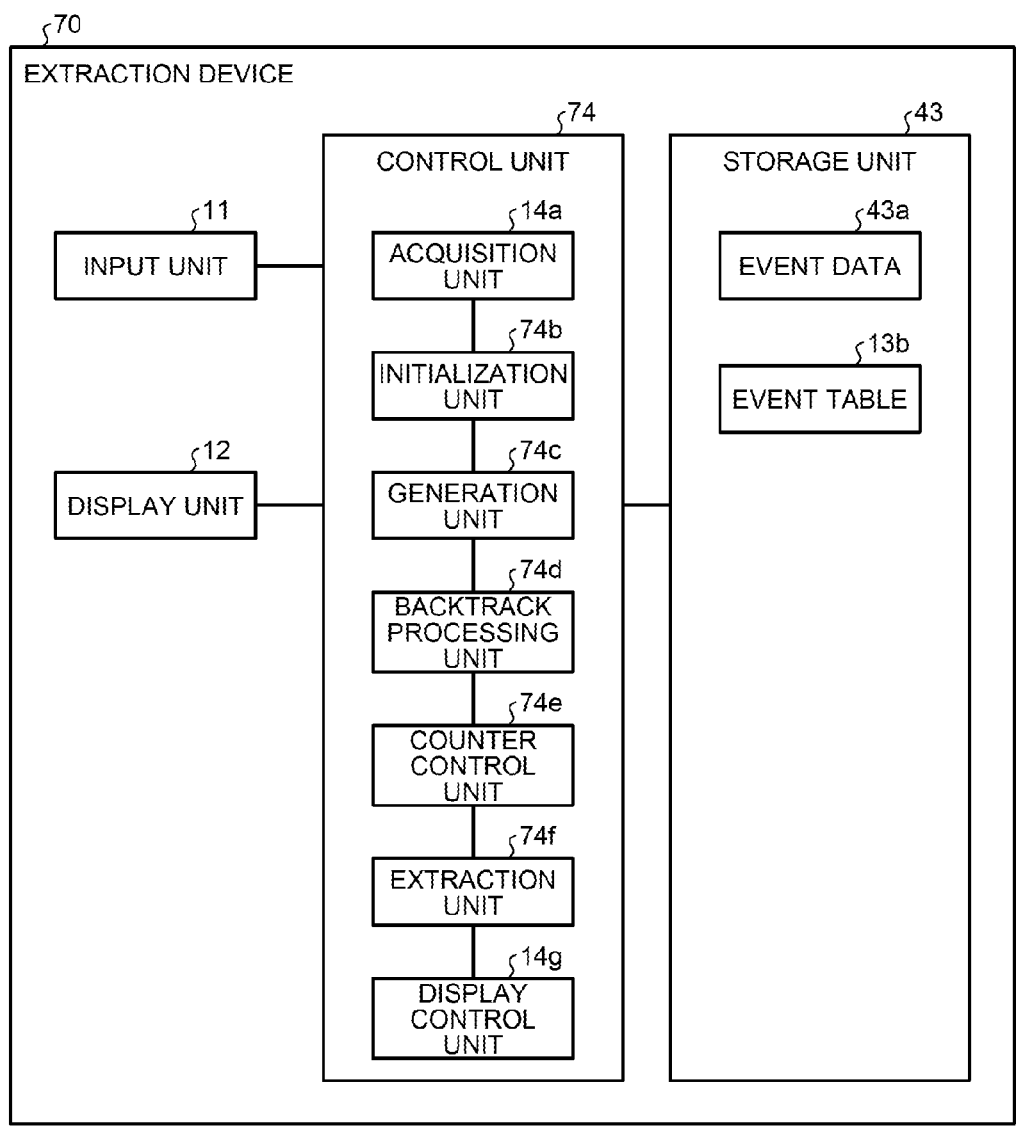
FIG. 26 is a diagram illustrating an example of a functional configuration of an extraction device according to a third embodiment of the present invention.

A description will next be made of an extraction device according to a third embodiment of the present invention. As illustrated in FIG. 26, an extraction device 70 includes a control unit 74. The control unit 74 differs from the control unit 44 according to the second embodiment illustrated in FIG. 11 in that the control unit 74 includes an initialization unit 74b, a generation unit 74c, a backtrack processing unit 74d, a counter control unit 74e, and an extraction unit 74f. Note that, hereinafter, the same numerals as those in FIGS. 1 and 11 will be given to units and devices performing the same functions as those of the first and the second embodiment above, and descriptions thereof may be omitted.

The input unit 11 enters information into the control unit 74. For example, the input unit 11 accepts an instruction from the user, and enters, into the control unit 74, an instruction to execute the extraction process. The input unit 11 also accepts an instruction from the user, and enters, into the control unit 74, an instruction to acquire the event data 43a to be described later from a predetermined server. The input unit 11 accepts an operation from the user, and supplies the event table 13b into the control unit 74. A keyboard and a mouse are examples of devices of the input unit 11.

The display unit 12 displays thereon various types of information. For example, the display unit 12 displays thereon an episode extracted by the extraction unit 74f to be described later under the control of the display control unit 14g to be described later.

The control unit 74 includes an internal memory for storing therein programs defining various processing procedures and control data, and performs various processes using these programs and the control data. The control unit 74 includes the acquisition unit 14a, the initialization unit 74b, the generation unit 74c, the backtrack processing unit 74d, the counter control unit 74e, the extraction unit 74f, and the display control unit 14g.

The initialization unit 74b performs various types of initialization. For example, when the acquisition unit 14a has acquired the event data 43a and the event table 13b, the initialization unit 74b sets an empty episode as the first parent, that is, the root in the enumeration tree. The initialization unit 74b sets a definite portion to be described later to be empty.

Then, the initialization unit 74b initializes the counters 20a and 20b of the event table 13b by setting the values of the counters 20a and 20b to "0". Next, the initialization unit 74b sets, to the value of the window width, the value of a threshold to be used in a process performed by the generation unit 74c to be described later to determine whether all of the counters in the columns including the selected candidate event e are less than the threshold.

The generation unit 74c generates various episodes. An embodiment of the generation unit 74c will be described. The generation unit 74c first selects the root episode 50 as illustrated in FIG. 12 mentioned above.

Then, the generation unit 74c determines whether there are a candidate event to be added to the selected episode and a candidate part to which the event is to be added. Here, in the present embodiment, the event is added behind or in front of the definite portion. The definite portion refers to an event group or a part of an episode whose descendant episode is to have no new event added thereto. The following description gives an example in which the event is added behind the definite portion. In the present embodiment, a case will be described in which the empty episode 50 includes the first to the third parts. The present embodiment assumes that the same events are not included in the same part. When there is any unselected candidate event among the predetermined events A to E in combinations with the parts behind the definite portion of the selected episode, the generation unit 74c determines that there is a candidate event to be added to the selected episode. When, instead, there is no unselected candidate event among the predetermined events A to E in the combinations with the parts behind the definite portion, the generation unit 74c determines that there is no candidate event to be added to the selected episode.

In the case in which the display of the display unit 12 is controlled so as to display the episode using the display control unit 14g, the generation unit 74c also determines whether there are a candidate event to be added to the selected episode and a candidate part to which the event is to be added. In the case in which the backtrack processing unit 74d determines that the deleted event is not the last event of the episode, the generation unit 74c determines, in the same way, whether there are a candidate event to be added to the selected episode and a candidate part to which the event is to be added. In the case in which the backtrack processing unit 74d has added the maximum value of counters to the threshold, the generation unit 74c also determines, in the same way, whether there are a candidate event to be added to the selected episode and a candidate part to which the event is to be added.

Figure 27:
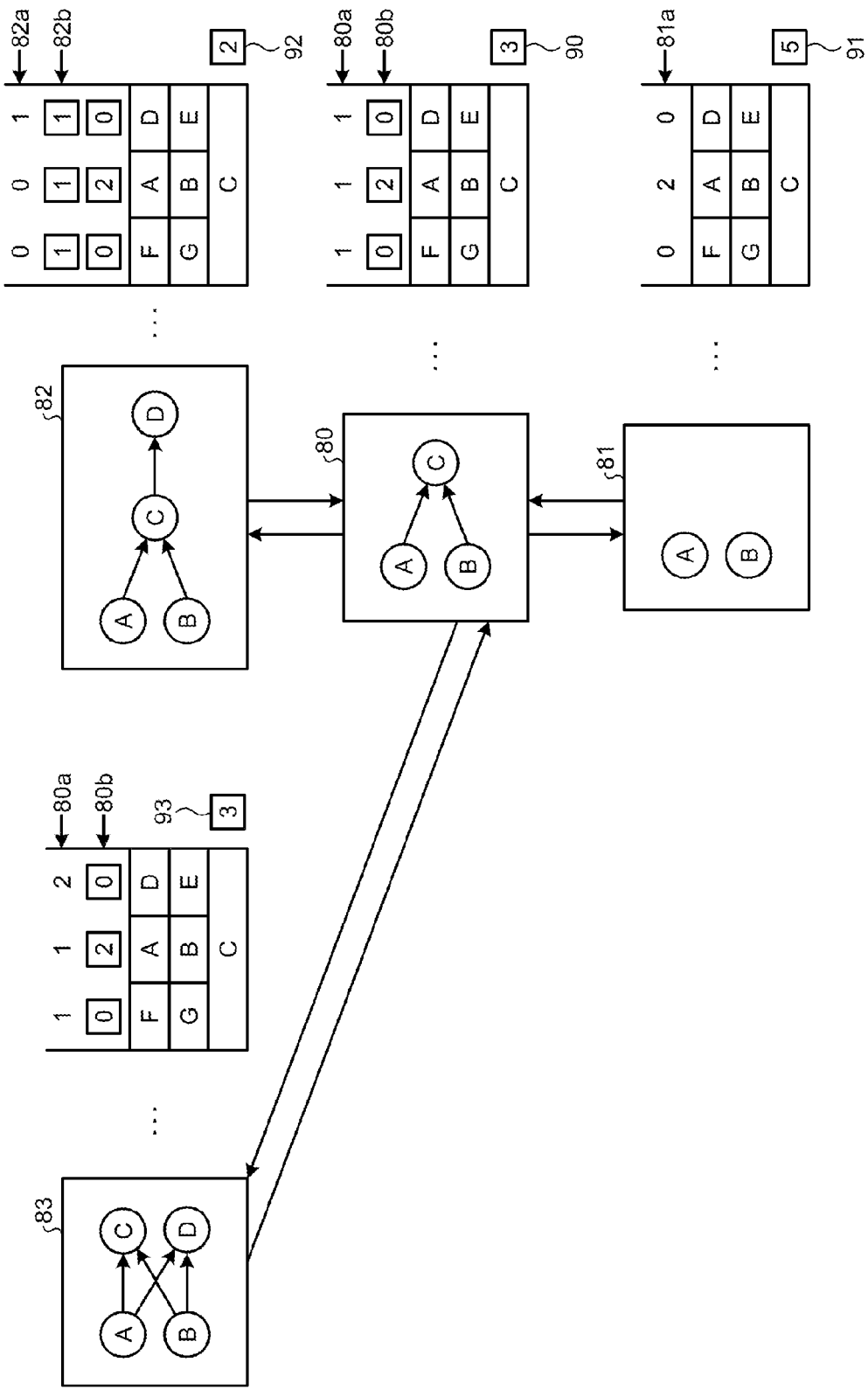
FIG. 27 is a diagram for explaining an example of a process executed by the extraction device according to the third embodiment.

When there are a candidate event to be added to the selected episode and a part to which the event is to be added, the generation unit 74c selects one unselected event as the candidate event e and selects one candidate part. Then, the generation unit 74c determines whether the place of addition of the selected candidate event e is behind the other events included in the selected episode. FIG. 27 is a diagram for explaining an example of a process executed by the extraction device according to the third embodiment. In the example of FIG. 27, suppose a case in which an episode 80 is selected. When the event D is selected as an event to be added, and a part behind a part including the events A to C is selected as a part to which the event is to be added, the place of addition of the event D is located in the following position. That is, the place of addition of the selected event D is located behind the events A to C included in the episode 80. In such a case, the generation unit 74c determines that the place of addition of the event D serving as the selected candidate event is behind the other events A to C included in the selected episode 80.

When an episode 81 is selected in the example of FIG. 27, the place of addition of the selected event C is behind the events A and B included in the episode 81. Therefore, when the episode 81 is selected in the example of FIG. 27, the generation unit 74c determines that the place of addition of the event C serving as the selected candidate event is behind the other events A and B included in the selected episode 81.

When the place of addition of the selected candidate event e is behind the other events included in the selected episode, the generation unit 74c determines whether the maximum value of the counters is less than the threshold. For example, in the example of FIG. 27, when, in the case in which the episode 80 is selected, the event D is selected, and the part behind the part including the events A to C is selected as a part to which the event is to be added, the generation unit 74c performs the following process. That is, the generation unit 74c determines that the maximum value "1" of counters 80a (counters corresponding to the episode 80) is less than a corresponding threshold "3" indicated by numeral "90". When the episode 81 is selected in the example of FIG. 27, the generation unit 74c determines that the maximum value "2" of counters 81a (counters corresponding to the episode 81) is less than a corresponding threshold "5" indicated by numeral "91".

When the maximum value of the counters is not less than the threshold, the generation unit 74c performs the above-described process of determining whether there are a candidate event to be added to the selected episode and a part to which the event is to be added, and performs again the processes following that process.

When the maximum value of the counters is less than the threshold, the generation unit 74c updates the threshold by subtracting the maximum value of the counters from the threshold. For example, in the example of FIG. 27, when, in the case in which the episode 80 is selected, the event D is selected, and the part behind the part including the events A to C is selected as a part to which the event is to be added, the generation unit 74c performs the following process. That is, the generation unit 74c subtracts the maximum value "1" of the counters 80a from the threshold "3" indicated by numeral "90" to update the threshold to a threshold "2" indicated by numeral "92". When the episode 81 is selected in the example of FIG. 27, the generation unit 74c subtracts the maximum value "2" of the counters 81a from the threshold "5" indicated by numeral "91" to update the threshold to the threshold "3" indicated by numeral "90".

Then, the generation unit 74c saves all of the counters into stacks, and thereafter sets all of the counters to "0". For example, in the example of FIG. 27, when, in the case in which the episode 80 is selected, the event D is selected, and the part behind the part including the events A to C is selected as a part to which the event is to be added, the generation unit 74c performs the following process. That is, the generation unit 74c saves three values "1", "1", and "1" of the counters 80a corresponding to the episode 80 into stacks 82b, and thereafter sets all of the counters 82a to "0". When the episode 81 is selected in the example of FIG. 27, the generation unit 74c saves three values "0", "2", and "0" of the counters 81a corresponding to the episode 81 into stacks 80b, and thereafter sets all of the counters 80a to "0".

Then, the generation unit 74c sets the events in front of the added event to be the definite portion. For example, in the example of FIG. 27, when, in the case in which the episode 80 is selected, the event D is selected, and the part behind the part including the events A to C is selected as a part to which the event is to be added, the generation unit 74c performs the following process. That is, the generation unit 74c sets the events A to C (part of the events A to C) in front of the added event D to be the definite portion. When the episode 81 is selected in the example of FIG. 27, the generation unit 74c sets the events A and B (part of the events A and B) in front of the added event C to be the definite portion.

Then, the generation unit 74c generates an episode by adding the selected candidate event e to the selected part of the selected episode. For example, in the example of FIG. 27, when, in the case in which the episode 80 is selected, the event D is selected, and the part behind the part including the events A to C is selected as a part to which the event is to be added, the generation unit 74c performs the following process. That is, the generation unit 74c generates an episode 82 by adding the event D to the selected part of the selected episode 80. When the episode 81 is selected in the example of FIG. 27, the generation unit 74c generates the episode 80 by adding the event C to the selected part of the selected episode 81. The generation unit 74c subsequently selects the generated episode.

If, as a result of the determination of whether there are a candidate event to be added to the selected episode and a candidate part to which the event is to be added, there is no candidate event to be added or no candidate part to which the event is to be added, the generation unit 74c performs the following process. That is, the generation unit 74c determines whether all the episodes are generated except episodes that are no longer generated because of the pruning. If all the episodes are generated except episodes that are no longer generated because of the pruning, the process is terminated.

When the place of addition of the selected candidate event e is not behind the other events included in the selected episode, the generation unit 74c determines whether all of the counters in the columns including the selected candidate event e are less than the threshold in the event table 13b. When it is not determined that all of the counters are less than the threshold, the generation unit 74c performs the above-described process of determining whether there are a candidate event and a candidate part, and performs again the processes following that process. When all of the counters are less than the threshold, the generation unit 74c performs the process of generating an episode by adding the selected candidate event e to the selected part of the selected episode, and performs again the processes following that process. For example, in the example of FIG. 27, when, in the case in which the episode 80 is selected, the event D is selected, and the part including the event C is selected as a part to which the event D is to be added, the generation unit 74c performs the following process. That is, the generation unit 74c generates the episode 82 by adding the event D to the selected part of the selected episode 80.

The backtrack processing unit 74d performs backtracking. For example, when the generation unit 74c determines that an episode generated by the generation unit 74c does not occur frequently, the backtrack processing unit 74d deletes the last added event e from the episode to generate an episode. Then, the backtrack processing unit 74d selects the generated episode. When the generation unit 74c does not determine that all the episodes are generated except episodes that are no longer generated because of the pruning, the backtrack processing unit 74d also performs the same processing. That is, the backtrack processing unit 74d deletes the last added event e from the selected episode to generate an episode, and selects the generated episode.

When the counter control unit 74e has decremented a value of a counter by one, the backtrack processing unit 74d determines whether the deleted event is the last event of the episode before the deletion. For example, in the example of FIG. 27, when the episode 80 is selected and the episode before the deletion is the episode 82, the backtrack processing unit 74d determines that the deleted event D is the last event of the episode 82 before the deletion. When the episode 80 is selected and the episode before the deletion is an episode 83 in the example of FIG. 27, the backtrack processing unit 74d determines that the deleted event C is not the last event of the episode 83 before the deletion. When the episode 81 is selected and the episode before the deletion is the episode 80 in the example of FIG. 27, the backtrack processing unit 74d determines that the deleted event C is the last event of the episode 80 before the deletion.

When the event is the last event, the backtrack processing unit 74d updates the definite portion by setting the immediately previous definite portion as a new definite portion. For example, when the episode 81 is selected and the episode before the deletion is the episode 80 in the example of FIG. 27, the backtrack processing unit 74d sets the definite portion to be an empty episode. When the episode 80 is selected and the episode before the deletion is the episode 82 in the example of FIG. 27, the backtrack processing unit 74d sets the events A and B (part of the events A and B) to be the definite portion.

Then, the backtrack processing unit 74d restores all of the counters from the stacks. For example, when the episode 81 is selected and the episode before the deletion is the episode 80 in the example of FIG. 27, the backtrack processing unit 74d performs the following process. That is, the backtrack processing unit 74d returns "0", "2", and "0" stored in the stacks 80b to restore the values of the counters 81a to "0", "2", and "0". When the episode 80 is selected and the episode before the deletion is the episode 82 in the example of FIG. 27, the backtrack processing unit 74d returns "1", "1", and "1" stored in the stacks 82b to restore the values of the counters 80a to "1", "1", and "1".

Next, the backtrack processing unit 74d updates the threshold by adding the maximum value of the counters to the threshold. For example, when the episode 80 is selected and the episode before the deletion is the episode 82 in the case illustrated in FIG. 27, the backtrack processing unit 74d performs the following process. That is, the backtrack processing unit 74d sets the threshold indicated by numeral "90" to a value "3" obtained by adding the maximum value "1" of the values "1", "1", and "1" of the counters 80a to the threshold "2" indicated by numeral "92", thus updating the threshold. When the episode 81 is selected and the episode before the deletion is the episode 80 in the case illustrated in FIG. 27, the backtrack processing unit 74d performs the following process. That is, the backtrack processing unit 74d sets the threshold indicated by numeral "91" to a value "5" obtained by adding the maximum value "2" of the values "0", "2", and "2" of the counters 81a to the threshold "3" indicated by numeral "90", thus updating the threshold.

When the generation unit 74c has generated the episode, the counter control unit 74e increments by one the value of the counter in the column of the event table 13b including the candidate event e that was added when the episode was generated. The counter control unit 74e decrements by one the value of the counter in the column of the event table 13b including the event e deleted by the backtrack processing unit 74d.

When the counter control unit 74e has incremented the value of the counter in the column including the candidate event e by one, the extraction unit 74f calculates the frequency of the generated episode. Based on the frequency of the generated episode, the extraction unit 74f determines whether the episode occurs frequently. The extraction unit 74f extracts, as an episode to be displayed, the episode that is determined to occur frequently.

The display control unit 14g controls the display of the display unit 12 so as to display various types of information. For example, the display control unit 14g controls the display of the display unit 12 so as to display the episode extracted by the extraction unit 74f.

The control unit 74 is an integrated circuit such as an application-specific integrated circuit (ASIC) or a field-programmable gate array (FPGA), or an electronic circuit such as a central processing unit (CPU) or a microprocessing unit (MPU).

Procedure of Processes

Figure 28:
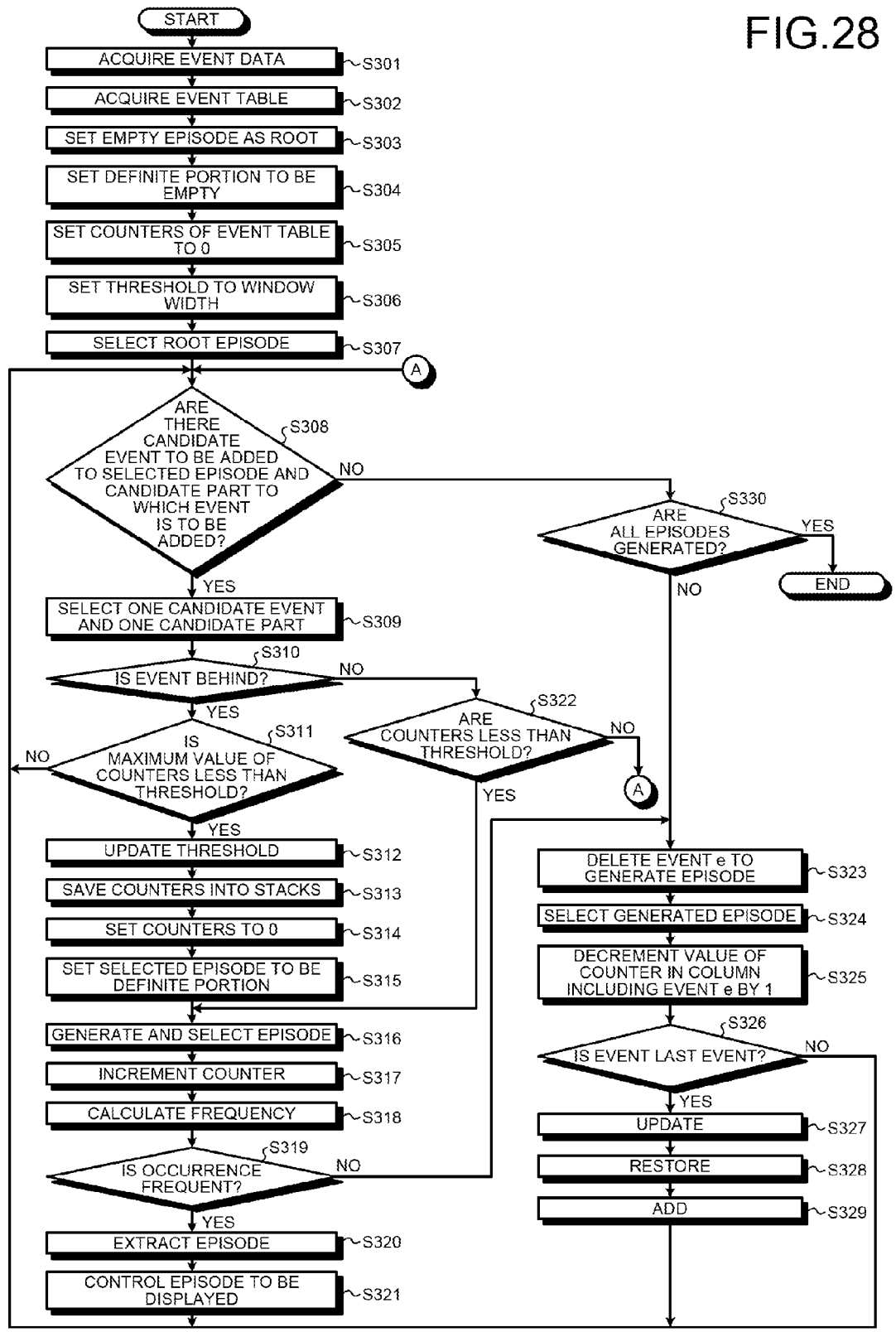
FIG. 28 is a flowchart illustrating the procedure of an extraction process according to the third embodiment.

A description will next be made of the procedure of the processes of the extraction device 70 according to the present embodiment. FIG. 28 is a flowchart illustrating the procedure of the extraction process according to the third embodiment. Various types of timing can be considered as execution timing of the extraction process. For example, the control unit 74 executes the extraction process when an instruction to execute the extraction process is entered from the input unit 11.

As illustrated in FIG. 28, the acquisition unit 14a acquires the event data 43a (S301). Next, the acquisition unit 14a acquires the event table 13b (S302). Then, the initialization unit 74b sets an empty episode as the first parent, that is, the root in the enumeration tree (S303). The initialization unit 74b sets the definite portion to be empty (S304).

Then, the initialization unit 74b initializes the counters 20a and 20b of the event table 13b by setting the values of the counters 20a and 20b to "0" (S305). Next, the initialization unit 74b sets, to the value of the window width, the value of the threshold used in determination of whether the episode occurs frequently (S306).

The generation unit 74c selects the root episode 50 (S307). Then, the generation unit 74c determines whether there are a candidate event to be added to the selected episode and a candidate part to which the event is to be added (S308).

If there are a candidate event to be added to the selected episode and a part to which the event is to be added (Yes at S308), the generation unit 74c selects one unselected event as the candidate event e and one candidate part (S309). Next, the generation unit 74c determines whether the place of addition of the selected candidate event e is behind the other events included in the selected episode (S310).

If the place of addition of the selected candidate event e is behind the other events included in the selected episode (Yes at S310), the generation unit 74c determines whether the counter maximum value is less than the threshold (S311). If the counter maximum value is not less than the threshold (No at S311), the generation unit 74c returns to S308.

If the maximum value of the counters is less than the threshold (Yes at S311), the generation unit 74c updates the threshold by subtracting the maximum value of the counters from the threshold (S312). Then, the generation unit 74c saves all of the counters into the stacks (S313). The generation unit 74c then sets all of the counters to "0" (S314). The generation unit 74c sets the events in front of the added event to be the definite portion (S315).

Then, the generation unit 74c generates an episode by adding the selected candidate event e to the selected part of the selected episode, and selects the generated episode (S316). Then, the counter control unit 74e increments by one the value of the counter in the column of the event table 13b including the candidate event e that was added when the episode was generated (S317). Next, the extraction unit 74f calculates the frequency of the generated episode (S318). Based on the frequency of the generated episode, the extraction unit 74f determines whether the episode occurs frequently (S319). If the episode occurs frequently (Yes at S319), the extraction unit 74f extracts, as an episode to be displayed, the episode that is determined to occur frequently (S320). Then, the display control unit 14g controls the display of the display unit 12 so as to display the episode extracted by the extraction unit 44f (S321), and the process returns to S308.

If there is no candidate event to be added or no candidate part to which the event is to be added (No at S308), the generation unit 74c performs the following process. That is, the generation unit 74*c* determines whether all the episodes are generated except episodes that are no longer generated because of the pruning (S330). If all the episodes are generated except episodes that are no longer generated because of the pruning (Yes at S330), the process is terminated.

If the place of addition of the selected candidate event e is not behind the other events included in the selected episode (No at S310), the generation unit 74*c* performs the following process. That is, the generation unit 74*c* determines whether all of the counters in the columns including the selected candidate event e are less than the threshold in the event table 13*b* (S322). If all of the counters are less than the threshold (Yes at S322), the process proceeds to S316. If it is not determined that all of the counters are less than the threshold (No at S322), the process proceeds to S308.

If the episode does not occur frequently (No at S319), or if it is not determined that all the episodes are generated except episodes that are no longer generated because of the pruning (No at S330), the backtrack processing unit 74*d* performs the following process. That is, the backtrack processing unit 74*d* deletes the last added event e from the episode generated by the generation unit 74*c* to generate an episode (S323). The backtrack processing unit 74*d* then selects the generated episode (S324). Next, the counter control unit 74*e* decrements by one the value of the counter in the column of the event table 13*b* including the event e deleted by the backtrack processing unit 74*d* (S325).

Next, the backtrack processing unit 74*d* determines whether the deleted event is the last event of the episode (S326). If the deleted event is the last event (Yes at S326), the backtrack processing unit 74*d* updates the definite portion by setting the immediately previous definite portion as a new definite portion (S327). Then, the backtrack processing unit 74*d* restores all of the counters from the stacks (S328). The backtrack processing unit 74*d* subsequently updates the threshold by adding the maximum value of the counters to the threshold (S329), and the process returns to S308. The process also returns to S308 if the deleted event is not the last event (No at S326).

As described above, when adding an event to an episode to generate a new episode, the extraction device 70 according to the present embodiment performs the following process if the event added to the episode is an event added at the end of events. That is, the extraction device 70 updates the threshold by setting it, as a new threshold, to a value obtained by subtracting, from the threshold representing the size of the window width, the number of events included in the combinations of mutually exclusive events indicated by the event table 13*b* among the events of the episode other than the added event. Then, when the threshold has been updated, the extraction device 70 performs the following process based on the combinations of mutually exclusive events indicated by the event table 13*b* when adding the event at the end of events of the episode to generate a new episode. That is, if the number of occurrence, among the added events, of each of the events included in the combinations is not more than the threshold after being updated, the extraction device 70 generates a new episode. This keeps the extraction device 70 from generating episodes that include time exceeding the window width. This, in turn, keeps the extraction device 70 from performing unnecessary processes, such as the process to calculate the frequency of episodes that exceed the window width and are not extracted, and the process to determine whether such episodes occur frequently. This, in turn, allows the extraction device 70 to efficiently extract the episodes.

The extraction device 70 according to the present embodiment also generates an episode by deleting an event last added to an episode from the episode that has a frequency not satisfying a predetermined condition and thus does not occur frequently. If the event deleted when the episode is generated is the event at the end, the extraction device 70 performs the following process. That is, the extraction device 70 obtains a value as a threshold by adding, to the updated threshold, the number of events included in the combinations of mutually exclusive events indicated by the event table 13*b* among the events of the generated episode, and thereby newly updates the threshold. Then, when a further new episode is to be generated from the newly generated episode, the extraction device 70 performs the following process based on the combinations of mutually exclusive events indicated by the event table 13*b*. That is, if the number of occurrence, in the further new episode, of each of the events included in the combinations is not more than the newly updated threshold, the extraction device 70 generates a further new episode. Therefore, when an episode is generated by deleting an event, the extraction device 70 updates the threshold to a value corresponding to the number of events included in the generated episode. This keeps the extraction device 70 from generating an episode that includes time exceeding the window width when the episode is generated by deleting an event. This, in turn, keeps the extraction device 70 from performing the following unnecessary processes when an episode is generated by deleting an event. That is, the extraction device 70 is kept from performing unnecessary processes, such as the process to calculate the frequency of episodes that exceed the window width and are not extracted, and the process to determine whether such episodes occur frequently. This, in turn, allows the extraction device 70 to efficiently extract the episodes.

Although description has been made of the embodiments related to the device disclosed herein, the present invention can be implemented in various different forms other than those of the embodiments described above. A description will now be made below of other embodiments included in the present invention.

A case has been described in which, for example, the device disclosed herein adds an event behind the definite portion, and determines whether the place of addition of the selected candidate event e is behind the other events included in the selected episode. However, the disclosed device is not limited to this. The disclosed device can add an event in front of the definite portion, and can determine whether the place of addition of the selected candidate event e is in front of the other events included in the selected episode. This case allows the disclosed device to perform the same process as that described above. In other words, the disclosed device generates an episode by deleting an event last added to an episode from the episode that has a frequency not satisfying a predetermined condition and thus does not occur frequently. If the event deleted when the episode is generated is the event at the start, the disclosed device performs the following process. That is, the disclosed device obtains a value as a threshold by adding, to the updated threshold, the number of events included in the combinations of mutually exclusive events indicated by the event table 13*b* among the events of the generated episode, and thereby newly updates the threshold. Then, when a further new episode is to be generated from the newly generated episode, the disclosed device performs the following process based on the combinations of mutually exclusive events indicated by the event table 13*b*. That is, if the number of occurrence, in the further new episode, of each of the events included in the combinations is not more than the newly updated threshold, the disclosed device generates a further new episode. This keeps the disclosed device from performing unnecessary processes, such as the process to calculate the frequency of episodes that exceed the window width and are not extracted, and the process to determine whether such episodes occur frequently. This, in turn, allows the disclosed device to efficiently extract the episodes.

Among the processes described in the embodiments, all or some of the processes described as being performed automatically can be performed manually.

The processes at the steps of the processes described in the embodiments can be optionally subdivided or integrated according to various conditions of load and/or use. Some steps can also be omitted.

The orders of processes at the steps of the processes described in the embodiments can be changed according to various conditions of load and/or use.

The constituent elements of the illustrated devices are functionally conceptual, and need not be physically configured as illustrated. In other words, the specific state of dispersion and integration of each of the devices is not limited to be as illustrated, but can be entirely or partially configured to be functionally or physically dispersed or integrated in any units according to various conditions of load and/or use.

Extraction Program

The extraction process of each of the above-described extraction devices (10, 41, and 70) can also be achieved by executing a prepared program on a computer system such as a personal computer or a workstation. A description will now be made below, using FIG. 29, of an example of a computer that executes an extraction program including the same functions as those of the extraction devices described above.

Figure 29:
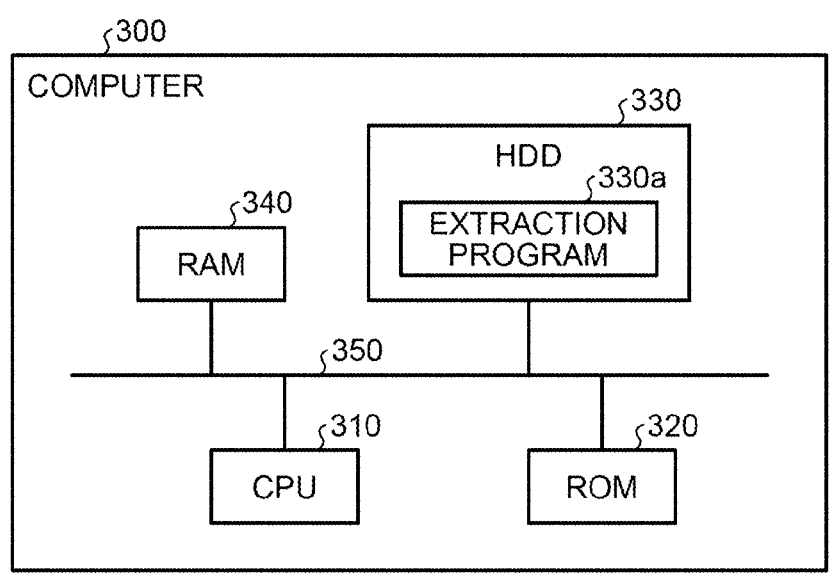
FIG. 29 is a diagram illustrating a computer that executes an extraction program.

FIG. 29 is a diagram illustrating the computer that executes the extraction program. As illustrated in FIG. 29, this computer 300 includes a central processing unit (CPU) 310, a read-only memory (ROM) 320, a hard disk drive (HDD) 330, and a random access memory (RAM) 340. These units 300 to 340 are connected via a bus 350.

The HDD 330 stores therein in advance an extraction program 330a that implements the same functions as those of the units 14a to 14g described in the first embodiment, of the units 14a, 44b to 44f, and 14g described in the second embodiment, or of the units 14a, 74b to 74f, and 14g described in the third embodiment, each described above. The extraction program 330a may be fragmented as appropriate.

The CPU 310 reads the extraction program 330a from the HDD 330 and executes the program.

The event data and the event table are provided in the HDD 330.

The CPU 310 reads the event data and the event table, and stores them into the RAM 340. The CPU 310 executes the extraction program 330a using the event data and the event table stored in the RAM 340. The RAM 340 need not always store therein all the data, but needs to store therein only pieces of data used for processing among all pieces of the data.

The extraction program 330a need not be stored in the HDD 330 from the start.

For example, the program may be stored in a "physical medium for portable use" to be inserted into the computer 300, such as a flexible disk (FD), a CD-ROM, a DVD, a magneto-optical disk, or an IC card. The program may be read from such a medium, and executed by the computer 300.

Furthermore, the program may be stored in another computer (or a server) connected to the computer 300 via a public line, the Internet, a LAN, a WAN, and/or the like. The program may be read from such a computer or a server, and executed by the computer 300.

According to an aspect of an extraction program, an extraction device, and an extraction method, patterns can be efficiently extracted.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. A non-transitory computer-readable recording medium having stored therein an extraction program that causes a computer to execute a process comprising:
   when a second pattern is to be generated by adding an event to a first pattern including events, generating the second pattern when, based on combinations of events stored in a storage unit, number of occurrence, in the second pattern, of each of the events included in the combinations is not more than a threshold;
   based on data including a plurality of events stored in the storage unit, calculating a frequency at which the second pattern occurs in the data;
   extracting the second pattern having the frequency satisfying a predetermined condition; and
   adding an event to the extracted second pattern.

2. The non-transitory computer-readable recording medium according to claim 1, wherein
   the data is event data including a plurality of pieces of data that associate the events with occurrence times of the respective events;
   the generating of the second pattern includes generating the second pattern when the number of occurrence, in the second pattern, of each of the events included in the combinations is not more than a threshold determined based on a predetermined window width; and
   the calculating of the frequency includes calculating the frequency based on the events associated with the occurrence times thereof included in the predetermined window width.

3. The non-transitory computer-readable recording medium according to claim 2, the extraction program causing the computer to further execute a process comprising:
   when the event added to the first pattern to generate the second pattern is an event added at start or end of the events of the first pattern, updating the threshold by setting the threshold to a value obtained by subtracting, from the threshold before being updated, number of events included in the combinations among the events of the first pattern other than the event added to the first pattern, wherein
   when the threshold has been updated when the event is to be added at the start or the end of the events of the first pattern to generate the second pattern, the generating of the second pattern includes generating the second pattern when, based on the combinations of events stored in the storage unit, the number of occurrence, among the added events, of each of the events included in the combinations is not more than the updated threshold.

4. The non-transitory computer-readable recording medium according to claim 3, the extraction program causing the computer to further execute a process comprising:

generating the first pattern by deleting an event last added to the second pattern from the second pattern having the frequency not satisfying the predetermined condition, wherein when the event deleted when the first pattern is generated is an event at the start or the end, the updating of the threshold includes newly updating the threshold by setting the threshold to a value obtained by adding, to the updated threshold, the number of events included in the combinations among the events of the first pattern; and when generating the second pattern by adding the event to the first pattern, the generating of the second pattern includes generating the second pattern when, based on the combinations, the number of occurrence, in the second pattern, of each of the events included in the combinations is not more than the newly updated threshold.

5. An extraction device comprising:

a memory that stores therein combinations of events and data including a plurality of events; and a processor coupled to the memory, wherein the processor executes a process comprising: when a second pattern is to be generated by adding an event to a first pattern including events, generating the second pattern when, based on the combinations of events stored in the memory, number of occurrence, in the second pattern, of each of the events included in the combinations is not more than a threshold;

based on the data including a plurality of events stored in the memory, calculating a frequency at which the second pattern occurs in the data;

extracting the second pattern having the frequency satisfying a predetermined condition; and adding an event to the extracted second pattern.

6. The extraction device according to claim 5, wherein the data is event data including a plurality of pieces of data that associate the events with occurrence times of the respective events;

the generating of the second pattern includes generating the second pattern when the number of occurrence, in the second pattern, of each of the events included in the combinations is not more than a threshold determined based on a predetermined window width; and the calculating of the frequency includes calculating the frequency based on the events associated with the occurrence times thereof included in the predetermined window width.

7. The extraction device according to claim 6, wherein the processor further executes a process comprising:

when the event added to the first pattern to generate the second pattern is an event added at start or end of the events of the first pattern, updating the threshold by setting the threshold to a value obtained by subtracting, from the threshold before being updated, number of events included in the combinations among the events of the first pattern other than the event added to the first pattern, wherein when the threshold has been updated when the event is to be added at the start or the end of the events of the first pattern to generate the second pattern, the generating of the second pattern includes generating the second pattern when, based on the combinations of events stored in the storage unit, the number of occurrence, among the added events, of each of the events included in the combinations is not more than the updated threshold.

8. The extraction device according to claim 7, wherein the processor further executes a process comprising:

generating the first pattern by deleting an event last added to the second pattern from the second pattern having the frequency not satisfying the predetermined condition, wherein when the event deleted when the first pattern is generated is an event at the start or the end, the updating of the threshold includes newly updating the threshold by setting the threshold to a value obtained by adding, to the updated threshold, the number of events included in the combinations among the events of the first pattern; and when generating the second pattern by adding the event to the first pattern, the generating of the second pattern includes generating the second pattern when, based on the combinations, the number of occurrence, in the second pattern, of each of the events included in the combinations is not more than the newly updated threshold.

9. An extraction method executed by a computer, the extraction method comprising:

when a second pattern is to be generated by adding an event to a first pattern including events, generating the second pattern when, based on combinations of events stored in a storage unit, number of occurrence, in the second pattern, of each of the events included in the combinations is not more than a threshold, using a processor;

based on data including a plurality of events stored in the storage unit, calculating a frequency at which the second pattern occurs in the data, using the processor;

extracting the second pattern having the frequency satisfying a predetermined condition, using the processor; and adding an event to the extracted second pattern, using the processor.

10. The extraction method according to claim 9, wherein the data is event data including a plurality of pieces of data that associate the events with occurrence times of the respective events;

the generating of the second pattern includes generating the second pattern when the number of occurrence, in the second pattern, of each of the events included in the combinations is not more than a threshold determined based on a predetermined window width; and the calculating of the frequency includes calculating the frequency based on the events associated with the occurrence times thereof included in the predetermined window width.

11. The extraction method according to claim 10, wherein the extraction method further comprising:

when the event added to the first pattern to generate the second pattern is an event added at start or end of the events of the first pattern, updating the threshold by setting the threshold to a value obtained by subtracting, from the threshold before being updated, number of events included in the combinations among the events of the first pattern other than the event added to the first pattern, using the processor, wherein when the threshold has been updated when the event is to be added at the start or the end of the events of the first pattern to generate the second pattern, the generating of the second pattern includes generating the second pattern when, based on the combinations of events stored in the storage unit, the number of occurrence, among the added events, of each of the events included in the combinations is not more than the updated threshold.

12. The extraction method according to claim 11, wherein the extraction method further comprising:
  generating the first pattern by deleting an event last added to the second pattern from the second pattern having the frequency not satisfying the predetermined condition, using the processor, wherein
  when the event deleted when the first pattern is generated is an event at the start or the end, the updating of the threshold includes newly updating the threshold by setting the threshold to a value obtained by adding, to the updated threshold, the number of events included in the combinations among the events of the first pattern; and
  when generating the second pattern by adding the event to the first pattern, the generating of the second pattern includes generating the second pattern when, based on the combinations, the number of occurrence, in the second pattern, of each of the events included in the combinations is not more than the newly updated threshold.

* * * * *